US008620810B2

(12) United States Patent
Karantzis

(10) Patent No.: US 8,620,810 B2
(45) Date of Patent: Dec. 31, 2013

(54) METHODS AND SYSTEMS FOR VERIFYING TRANSACTIONS

(75) Inventor: Nickolas John Karantzis, Richmond (AU)

(73) Assignee: iSignthis Ltd., Tortola (VG)

( * ) Notice: Subject to any disclaimer, the term of this patent is extended or adjusted under 35 U.S.C. 154(b) by 0 days.

(21) Appl. No.: 13/576,477

(22) PCT Filed: Mar. 31, 2011

(86) PCT No.: PCT/AU2011/000377
§ 371 (c)(1),
(2), (4) Date: Aug. 1, 2012

(87) PCT Pub. No.: WO2011/120098
PCT Pub. Date: Oct. 6, 2011

(65) Prior Publication Data
US 2012/0323791 A1    Dec. 20, 2012

Related U.S. Application Data

(60) Provisional application No. 61/320,597, filed on Apr. 2, 2010, provisional application No. 61/349,741, filed on May 28, 2010.

(30) Foreign Application Priority Data

May 28, 2010    (AU) ................. 2010100533

(51) Int. Cl.
*G06Q 40/00*    (2012.01)
(52) U.S. Cl.
USPC ........................................... 705/44

(58) Field of Classification Search
USPC ........................................... 705/44
See application file for complete search history.

(56) References Cited

U.S. PATENT DOCUMENTS

| | | | |
|---|---|---|---|
| 7,827,115 B2 | 11/2010 | Weller et al. | |
| 8,249,961 B1 * | 8/2012 | Hopkins | 705/34 |
| 2002/0004772 A1 * | 1/2002 | Templeton et al. | 705/35 |
| 2002/0194138 A1 | 12/2002 | Dominguez et al. | |
| 2005/0097049 A1 | 5/2005 | Writer et al. | |

FOREIGN PATENT DOCUMENTS

EP    2209095 A1    7/2010

OTHER PUBLICATIONS

Nab Credit Card Fraud Protection, How to Protect Your Business and Your Customers, National Australia Bank Limited ABN, 2006.

(Continued)

*Primary Examiner* — Clifford Madamba
(74) *Attorney, Agent, or Firm* — Kilpatrick Townsend & Stockton LLP

(57) ABSTRACT

An aspect of the present invention provides a computer-implemented method for verifying authorization of a transaction. The method comprises the steps of: receiving a request to process an electronic transaction for a predetermined amount of money (215); dividing the predetermined amount into a plurality of charges (225); providing the plurality of charges to facilitate debiting of a financial instrument with each of the plurality of charges (235); receiving information relating to the plurality of charges from a user of the financial instrument after debiting of the charges (245); and verifying the transaction only if the information is correct (255).

21 Claims, 12 Drawing Sheets

(56) References Cited

OTHER PUBLICATIONS

Understanding Convenience versus Guaranteed Payment, Credit Card Merchant Transaction Information, http://web.archive.org/web/20040513231321/http://www.vantagecard.com/lessons/lesson1.html, 2004.

Credit Card Processing Chargebacks—The Best Offense is a Good Defense, http://web.archive.org/web/20090227065210/http://www.merchantcou . . . account/fraud-chargeback/credit-card-processing-chargebacks.php, 2009.

WBX Help, retrieved from Internet on Jul. 27, 2010, >http://web.archive.org/web/20070713152538/wbx.com/help/index.ashx (Select Payments > Card Verification from left hand menu)>, Published Jul. 13, 2007 as Per Internet Archive.

* cited by examiner

METHODS AND SYSTEMS FOR VERIFYING TRANSACTIONS

TECHNICAL FIELD

The present invention relates generally to payment transactions and more particularly to verification of authorisation of electronic payment transactions and/or financial instruments used to perform such transactions.

BACKGROUND

Widespread availability and use of computer systems and the Internet has resulted in electronic financial transactions becoming commonplace. The use of financial instruments such as credit cards, debit cards and bank accounts to purchase goods or services from online merchants or vendors is extremely convenient. However, the number of fraudulent transactions has also increased substantially. Merchants have little protection against fraudulent credit or debit transactions, particularly in "card not present" (CNP) circumstances (i.e., where card holders' bona fides cannot be verified by the use of conventional signature comparison or identification checks at the point of sale), and may be responsible the costs of such transactions and transport costs in relation to the goods. To make matters worse, merchants may additionally be responsible for intra-bank dishonour fees.

During a payment transaction using a payment card (e.g., a credit, debit, or stored value card), it is beneficial to verify a purchaser's (cardholder's) ownership of the card or an account associated with the card to avoid a variety of potential problems, such as unauthorised use, disputed use, or a later change of mind on the part of the purchaser (also known as 'friendly' or 'I didn't do it' fraud). Purchaser authentication is the process of verifying a cardholder's ownership of an account. A common method of authenticating a purchaser's ownership of an account occurs routinely at a point of sale during what is called a "card present" transaction. A card present transaction involves a merchant's representative swiping the card though a card payment terminal to verify account status and credit line availability, and then checking that the signature on the back of the card matches the purchaser's signature. This may be accompanied by checking of a photographic identification document such as the purchaser's driver's license. This process both identifies the purchaser and serves to provide specific authorisation for the particular transaction. Providing the merchant follows the specific guidelines for such transactions, the merchant will generally be guaranteed payment for the amount authorised less discount and fees.

In CNP transactions such as those occurring online, through the mail, or over the telephone, payments are not generally guaranteed to the merchant. The primary reason for CNP transactions not being guaranteed is that purchasers (cardholders) are not authenticated in situations where the merchant and the purchaser are not physically together with the card at the time of processing the transaction. This gives rise to financial risks associated with the transaction, which are generally carried by the merchant. Such risks include: chargebacks of payment transactions to online merchants (e.g., "disputed" use transactions), fraud for both merchants and cardholders (e.g., unauthorised use of stolen account information to purchase goods and services online), and increased expenses for financial institutions (which are often passed on to the merchant in any case). This unfortunately also leads to an increased public perception that buying goods and services online is unsafe and not secure, which prevents some consumers from purchasing online.

Disputed use transactions occur when a purchaser who is the authorised card holder disputes that a transaction occurred, even if they knowingly initiated such transaction but may have later changed their mind. Whilst rarer than unauthorised use or fraudulent transactions, disputed transactions nevertheless represent a risk for merchants as they are subject to potential chargebacks. Merchants often rely on delivery services with "signature on delivery" as the principal means to combat this type of fraud, however, this can be often be ineffective as parcels can be signed by others, the signature may be illegible or differ from cardholder's normal signature, or the parcel delivered to addresses that differ from the billing address. All of these have the potential to create a scenario for possible dispute with the cardholder and are susceptible to a chargeback.

Given the continuing growth of electronic commerce, it is desirable to provide methods capable of authenticating purchasers as the authorized cardholders and/or individual transactions on a case-by-case basis. This will potentially benefit all legitimate payment system participants including purchasers/cardholders, merchants, card schemes, and financial institutions.

Authenticating a purchaser as being the authorised cardholder (or a person authorised by the cardholder) and linking an authorisation to each transaction (just as in card present transactions) during online purchase transactions will reduce the levels of fraud, disputes, retrievals and charge-backs, which will consequently reduce the costs associated with each of these events. Authenticating the purchaser as being the authorised cardholder (or a person authorised by the cardholder) also addresses consumer security concerns and will likely lead to increased online sales. Given the foregoing, a system for authenticating both the identity of the purchaser and their authorisation regarding the specific online transaction on a case-by-case basis would be desirable during card not present (CNP) transactions. Such an authenticating system should preferably be relatively easy to implement and use, require a minimal investment of resources, and provide a high level of confidence surrounding the authorisation of the transaction. Such an authenticating system should preferably also cater for cross-currency transactions, in which a purchaser's card issue currency is different to the transaction currency of the seller or merchant.

Various checks are currently used to identify and discard fraudulent transactions. For example, credit card gateways generally recommend Address Verification Service (AVS) and Card Verification Value (CVV) checks. Failure of an AVS check suggests that the purchaser as the originator of the transaction may not be the owner of the card. Failure of a CVV check suggests that the originator of the transaction may not be in possession of the actual card. However, these checks are not foolproof as fraudsters are generally able to obtain the necessary information with sufficient effort. These checks, even if provided at time of transaction, do not always protect the merchant from 'chargebacks' whereby the authorised card holder can dispute that the transaction was authorised and claim that it was initiated by an unauthorised third party.

Another check is to lookup a purchaser's IP address with a geo-location service provider that also detects anonymous proxies. In most cases, the general geogaphical location of the IP address should match either the purchaser's billing or shipping address. Orders from anonymous proxies are generally considered to represent a higher risk because fraudsters frequently use anonymous proxies to hide their actual IP address.

Another check is to compare the geographical location of the purchaser's IP address against a list of high risk countries or territories.

Another check is to determine whether the goods will be shipped to a mail-forwarding company when the shipping and billing addresses are different. Such orders could be risky as the goods may be forwarded overseas.

Another check is to determine whether the zip or post code provided by the purchaser corresponds to the city and state for both the billing and shipping addresses. The AVS check referred to above only checks the zip code and numeric portion of the street address. Fraudsters may not always be in possession of the complete address and may be too lazy to do a zip code reverse lookup for additional address information.

Another check is to request the purchaser to forward a signed authorisation form with copies of the front and back of the card via facsimile. However, this is inconvenient and is thus generally only requested under suspicious circumstances. Furthermore, fraudsters have been known to create credit card images using graphic design software.

Another check is to request the purchaser to provide the bank name and customer service telephone number as listed on the card. Customer service may then be called to determine whether information provided matches bank records of the cardholder. This check is geneially effective but is time-consuming and inconvenient.

Another check is to provide the purchaser with a personal identification number (PIN) in advance of any transactions for use with each transaction. This is considered effective but purchasers generally need to apply separately and in advance for a PIN for CNP transactions, and can often misplace or confuse PINs.

A need exists for improved methods and systems that provide evidence or verify that an account or card holder has authorised a specific transaction or payment from a specific account or card, without introducing undue delays and/or unnecessary additional transactions or operations.

SUMMARY

An aspect of the present invention provides a computer-implemented method for verifying authorisation of a transaction. The method comprises the steps of: receiving a request to process an electronic transaction for a predetermined amount of money, the request comprising data identifying a particular financial instrument; dividing the predetermined amount into a plurality of charges; causing the financial instrument to be debited with each of the plurality of charges; receiving information relating to the plurality of charges from the originator of the request; and verifying the transaction only if the information is correct.

Another aspect of the present invention provides a computer system for verifying authorisation of a transaction. The computer system comprises: a memory for storing data and program instructions; and at least one processor coupled to the memory. The at least one processor is programmed to: receive a request to process an electronic transaction for a predetermined amount of money, the request comprising data identifying a particular financial instrument; divide the predetermined amount into a plurality of charges; cause the financial instrument to be debited with each of the plurality of charges; receive information relating to the plurality of charges from the originator of the request; and verify the transaction only if the information is correct.

Another aspect of the present invention provides a computer program product comprising a computer readable medium comprising a computer program recorded therein for verifying authorisation of a transaction. The computer program product comprises: computer program code means for receiving a request to process an electronic transaction for a predetermined amount of money, the request comprising data identifying a particular financial instrument; computer program code means for dividing the predetermined amount into a plurality of charges; computer program code means for causing the financial instrument to be debited with each of the plurality of charges; computer program code means for receiving information relating to the plurality of charges from the originator of the request; and computer program code means for verifying the transaction only if the information is correct.

Another aspect of the present invention provides a computer-implemented method for verifying transactions. The method comprises the steps of: receiving a request to verify an electronic transaction for a predetermined amount of money; dividing the predetermined amount into a plurality of charges; providing the plurality of charges to facilitate debiting of the financial instrument with each of the plurality of charges; receiving information relating to the plurality of charges, the information originating from a user of the financial instrument after the plurality of charges has been debited to the financial instrument; and verifying the transaction only if the received information is correct.

Another aspect of the present invention provides a computer system for verifying transactions. The computer system comprises: a memory for storing data and program instructions; and at least one processor coupled to the memory. The at least one processor is programmed to: receive a request to verify an electronic transaction for a predetermined amount of money; divide the predetermined amount into a plurality of charges; provide the plurality of charges to facilitate debiting of the financial instrument with each of the plurality of charges; receive information relating to the plurality of charges, the information originating from a user of the financial instrument after the plurality of charges has been debited to the financial instrument; and verify the transaction only if the received information is correct.

Another aspect of the present invention provides a computer program product comprising a computer readable medium comprising a computer program recorded therein for verifying transactions. The computer program product comprises: computer program code means for receiving a request to verify an electronic transaction for a predetermined amount of money; computer program code means for dividing the predetermined amount into a plurality of charges; computer program code means for providing the plurality of charges to facilitate debiting of the financial instrument with each of the plurality of charges; computer program code means for receiving information relating to the plurality of charges, the information originating from a user of the financial instrument after the plurality of charges has been debited to the financial instrument; and computer program code means for verifying the transaction only if the received information is correct.

In certain embodiments, the plurality of charges comprises two charges.

In certain embodiments, information relating to the plurality of charges may be stored and compared with the received information, when subsequently received, to determine whether the received information is correct.

The financial instrument may, for example, comprise: a bank account, a credit card, a debit card, a charge card, a store card, and a direct debit account facility.

The information relating to the plurality of charges may comprise: the amount of each of the plurality of charges or the number of the plurality of charges.

In certain embodiments, a currency exchange rate associated with the transaction may be stored.

BRIEF DESCRIPTION OF THE DRAWINGS

A small number of embodiments of the present invention will be described hereinafter with reference to the following drawings, in which.

Identical reference designators in different ones of the figures are intended to denote identical or substantially similar items unless indicated to the contrary.

DETAILED DESCRIPTION

Embodiments of methods and systems for verifying authorisation of transactions are described hereinafter. The methods and systems described hereinafter may be used to verify the legitimacy of the originator of a Card Not Present (CNP) transaction to utilise the financial instrument and subsequently, authorisation of a transaction.

For convenience, the embodiments are generally described using credit cards or debit cards as a financial instrument. However, it is not intended that the scope of the invention be limited in this manner as the invention has broad application to other financial instruments including, but not limited to, bank accounts and other stored value cards.

Also for convenience, the embodiments are generally described with reference to the purchaser, who may alternatively be referred to as the cardholder or the originator of the transaction.

Also for convenience, the embodiments are generally described with reference to online purchase of an item from a merchant (e.g., a vendor of physical or virtual goods, or a provider of services) by a purchaser who originates an online CNP transaction. However, it is not intended that the scope of the invention be limited in this manner as the invention has broad application to other Card Not Present (CNP) transactions, including Mail Order and Telesales Orders ("MOTO"), as well as linking of secondary details such as email addresses or Short Message Service (SMS), Multi-Media Messaging Service (MMS) or data-enabled telephones to the verified transaction, thus also verifying in addition to linking those secondary details to the transaction and payer (purchaser).

The verification methods and systems described hereinafter confirm that the purchaser (as originator of a CNP transaction) has access to an account associated with the financial instrument, and is highly probably the authorised cardholder or a person authorised by the cardholder.

Embodiments described hereinafter may be practised independently or in conjunction with the, various methods and checks referred to in the foregoing background section.

Figure 1A:
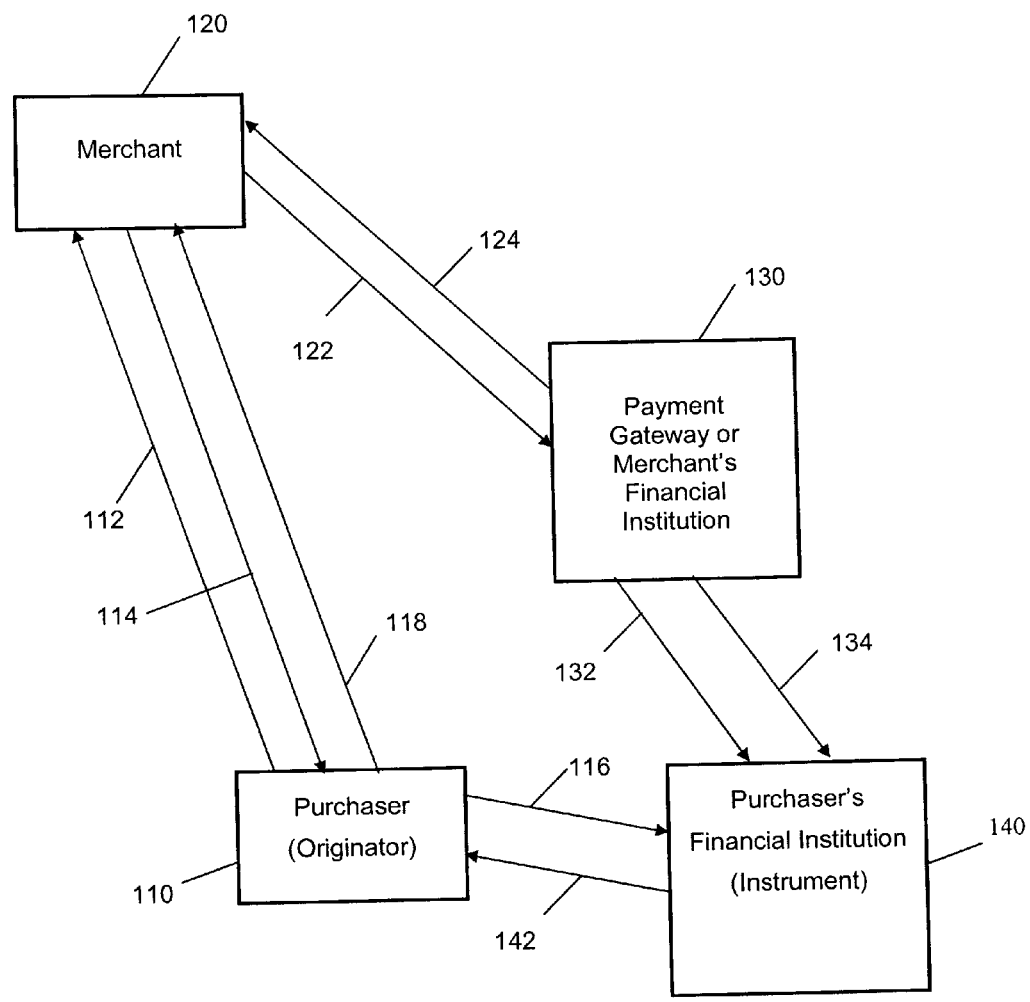
FIG. 1A is a schematic block diagram of a system for verifying transactions or authorisation of transactions in accordance with an embodiment of the present invention.

FIG. 1A is a schematic block diagram of a system for verifying electronic transactions or authorisation of electronic transactions.

Referring to FIG. 1A, a purchaser (or originator) 110, a merchant 120, a payment gateway 130, and the purchaser's financial institution (i.e., as provider of the financial instrument) 140 are typically represented or embodied by computer systems such as the computer system 300 described hereinafter with reference to FIGS. 3A and 3B. The payment gateway 130 may comprise an independent intermediary such as a clearing house or may alternatively be provided by the purchaser's financial institution or the merchant's financial institution. The computer systems of the purchaser 110, the merchant 120, the payment gateway 130, and the merchant's financial institution 140 are communicatively coupled via a communications network (not shown) such as a Local Area Network (LAN) or a Wide Area Network (WAN). Such networks may comprise private networks, public networks, wired networks or wireless networks, or any combination of the foregoing. In particular, the foregoing computer systems may be coupled via the Internet (not shown in FIG. 1A).

In operation, the purchaser (or originator) 110 sends a request 112 to the merchant 120 to process an electronic transaction for a predetermined amount of money. The request 112 may, for example, result from the purchaser 110 browsing a website of the merchant 120 (e.g., an online merchant) and electing to purchase an item offered for sale on the merchant's website. In this instance, the predetermined amount of money may correspond to the advertised or list price of the item. The request 112 typically includes identification details of a particular financial instrument (e.g., credit card, debit card, bank or other account, etc.) that the purchaser 110 wishes to use to pay for the item.

After receiving the request 112, the merchant 120 sends a request 122 to the payment gateway 130 to, process an electronic transaction for the predetermined amount of money using the purchaser's nominated financial instrument (in accordance with the Card Scheme Network's and/or the Financial Institution's process requirements).

After receiving the request 122, the payment gateway 130 proceeds to charge (i.e., debit) the financial instrument nominated by the purchaser 110 with two or more charges 132, 134 that add up to the predetermined amount of money. The payment gateway 130 divides the predetermined amount of money up into the multiple (i.e., two or more) charges, preferably in a random manner (e.g., using a computer software application including a random number generator).

In an alternative embodiment, the predetermined amount of money may be divided up into the multiple charges by the merchant 120 and the multiple charges may be communicated to the payment gateway 130 in the request 122.

After successfully debiting the purchaser's financial instrument identified in the requests 112 and 122, the purchaser 110 is advised (via the merchant in communications 124 and 114) that the purchaser's financial instrument has been debited. The purchaser 110 is also requested to provide information regarding the number of charges made to the purchaser's financial instrument and/or the amount of each charge. In another embodiment, the payment gateway 130 may communicate directly with the purchaser 110 in this regard.

The purchaser 110 then checks 116 his/her account relating to the financial instrument and determines or obtains 142 the number of charges (i.e., debits) and/or the individual amounts of the multiple charges debited by the payment gateway 130 on behalf of the merchant 120.

The purchaser 110 then advises or confirms 118 the individual amounts of the multiple charges to the merchant 120. Such advice or confirmation from the purchaser 110 may, for example, be via electronic data transfer, electronic mail (email), short message service (SMS) via cellular telephone, completion of an electronic form/entry screen made available online, or any other suitable means available, including verbally (via telephone). In alternative embodiments, the purchaser 110 may provide the advice or confirmation to or via another party, such as the payment gateway or merchant's financial institution 130.

Upon receipt of confirmation of the number of charges and the individual amounts of the multiple charges, the merchant 120 verifies authorisation of the transaction. Successful verification may, for example, relate to an internal requirement of the merchant 120 prior to releasing or shipping the relevant item/s to the purchaser 110.

In an alternative embodiment, it is incumbent on the purchaser 110 to check the account relating to his/her financial instrument after making the request 112 to determine the number of charges made and/or the amount of each charge (i.e., without being prompted to do so) and advise the merchant 120 or payment gateway or merchant's financial institution) 30 accordingly.

In other embodiments, the merchant's financial institution 130 or the purchaser's financial institution 140 may verify the transaction or authorisation of the transaction for the merchant 120, directly or via the payment gateway. Verification may, for example, relate to an advice of authorisation, clearing or actual settlement of funds to the merchant 120, following which the merchant 120 may release or ship the relevant item/s to the purchaser 110.

In other embodiments, a Card Scheme Network to which the relevant financial instrument is related (e.g., Visa, MasterCard®, American Express®, JCB etc.) may verify the transaction, either directly or via the merchant's financial institution or payment gateway 130, to the merchant 120. This may be undertaken in conjunction with the authorisation processes employed by the relevant financial institutions. Verification may, for example, relate to an advice from the Card Scheme Network via the merchant's financial institution or payment gateway 130 of verification and/or authorisation, or verification and commencement of clearing or actual settlement of funds to the merchant 120, following which the merchant 120 may release or ship the relevant item/s to the purchaser 110.

Division of the predetermined amount of money into the multiple charges may be performed by a verification agent, which typically comprises a computer software application. The verification agent may, for example, be resident and/or execute on:

- the merchant's computer system or network;
- the payment gateway's computer system or network;
- a computer system or network of the merchant's financial institution; or an independent computer system (e.g., a computer server accessible via the Internet by merchants, payment gateways and/or merchants' financial institutions;
- a computer system or network associated with a credit or charge card scheme such as Visa, MasterCard®, American Express®, etc.; or
- a combination of any of the above.

Following a request for verification of a transaction for a predetermined amount or authorisation of a transaction, the verification agent determines the number of charges into which the predetermined amount shall be divided into and the values associated with each of the charges. As described hereinbefore, the number of charges and/or the amount of each charge are preferably randomly determined (e.g., using a computer software application implemented random number generator). The information (i.e., the number of charges and/or the amount of each charge) is stored and forwarded to a payment gateway or financial institution for actual charging (debiting) to an account associated with the purchaser's financial instrument.

Information subsequently received from the purchaser (i.e., the number of charges and/or the amount of each charge) is compared to the stored information to determine whether the purchaser provided version of the information is correct. If correct, authorisation of the transaction is verified.

Comparison of the stored information with the information received from the purchaser is preferably performed by the verification agent, whether implemented at the payment gateway computer system, the merchant's computer system, the merchant's financial institution's computer system, the relevant card scheme network's computer system, or at an independent computer system.

Communication between the purchaser and the verification agent may be direct or indirect (e.g., via the payment gateway, merchant, merchant's financial institution, or card scheme network). Such communication may, for example, be via electronic data transfer, direct or relayed electronic mail (email), direct or relayed short message service (SMS) via cellular telephone, completion of an electronic form/entry screen made available on the world wide web or any other suitable means available, including verbally (via telephone) to an, operator who keys in the appropriate data. In cases where the communication is electronic, address and device details relating to the purchaser may be associated with the purchaser or transaction and stored for identification of the purchaser in subsequent transactions. Where information is received as part of the verification process via electronically routable addresses such as email addresses, sms-enabled mobile telephones, IP protocol, addresses, etc., then these electronically routable addresses may be associated with the purchaser or transaction following verification and stored for subsequent identification of the purchaser.

In cases where the purchaser's financial instrument and the merchant operate using different currencies, the currency exchange rate/s associated with a transaction may be requested from the financial institution and stored on a transaction-by-transaction basis to enable conversion and subsequent direct or indirect purchaser response to the verification agent in either of the currencies.

Figure 1B:
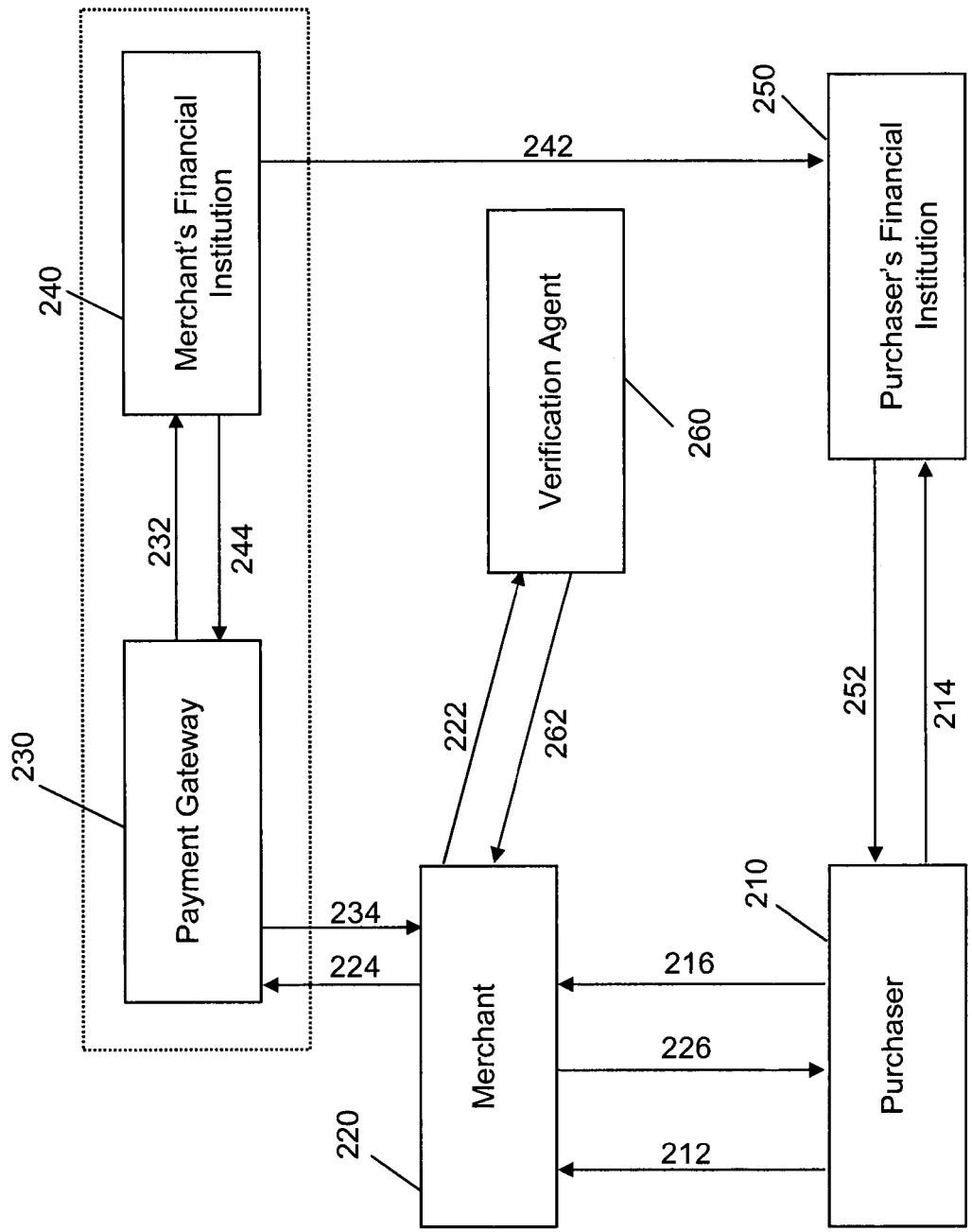
FIG. 1B is a schematic block diagram of a system for verifying transactions or authorisation of transactions in accordance with another embodiment of the present invention.

FIG. 1B is a schematic block diagram of another system for verifying transactions or authorisation of transactions.

Referring to FIG. 1B, a purchaser 210, a merchant 220, a payment gateway 230, the merchant's financial institution 240, and the purchaser's financial institution (as provider of the financial instrument) 250 are typically represented or embodied by computer systems such as the computer system 300 described hereinafter with reference to FIGS. 3A and 3B. The foregoing computer systems are typically communicatively coupled via one or more communications network/s (not shown). Such networks may, for example, comprise private networks, public networks, wired networks, wireless networks, Local Area Networks (LANs), Wide Area Networks (WANs), and any combination of the foregoing. In particular, the foregoing computer systems may be coupled via the Internet (not shown in FIG. 1B).

A verification agent 260 operates in conjunction with the computer system of the merchant 220. The verification agent 260 may, for example, comprise a computer software application resident on and executed by the computer system of the merchant 220. Alternatively, the verification agent 260 may comprise a separate computer server coupled to the computer system of the merchant 220 (e.g., via the Internet or a local area network (LAN)).

In operation, the purchaser (or originator) 210 sends a request 212 to the merchant 220 to process an electronic transaction for a predetermined amount of money. The request may, for example, result from the purchaser 210 browsing a website of the merchant 220 (e.g., an online merchant) and electing to purchase an item offered for sale on the merchant's website. In this instance, the predetermined amount of money may correspond to the advertised or list price of the item. The request 212 typically includes identification details of the particular financial instrument (e.g., credit card, debit card, bank or other account, etc.) that the purchaser 210 wishes to use to pay for the item.

After receiving the request 212, the merchant 210 forwards the request 222 to the verification agent 260.

On receipt, the verification agent 260 divides the predetermined amount of money into two or more charges, preferably in a random manner (e.g., using a computer software application including a random number generator), and returns the multiple charge amounts 262 to the merchant 220. The multiple charge amounts add up to the predetermined amount of money. Then, the merchant 220 requests 224, 232 the merchant's financial institution 240 via the payment gateway 230 to debit the purchaser's financial instrument identified in the requests 212, 224 with the two or more charges that add up to the predetermined amount of money.

The merchant's financial institution 240 debits 242 the account relating to the purchaser's financial instrument (at the purchaser's financial institution 250) with the multiple charges.

After the purchaser's financial instrument has been debited with the multiple charges, the purchaser 210 is advised 244, 234, 226 that his/her financial instrument has been debited by the merchant's financial institution 240 via the payment gateway 230 and the merchant 220.

The purchaser 210 checks 214 his/her account relating to the financial instrument at the purchaser's financial institution 250 and obtains 252 the number of charges (i.e., debits) and the individual amounts of each of the multiple charges debited by the merchant's financial institution 240.

The purchaser 210 then advises or confirms 216 the individual amounts of each of the multiple charges to the merchant 220 and/or the verification agent 260. In an alternative embodiment to that shown in FIG. 1B, the purchaser 210 may advise or confirm the individual amounts of each of the multiple charges directly to the verification agent 260 (i.e., not via the merchant 220). Such advice or confirmation may, for example, be via electronic data transfer, electronic mail (email), short message service (SMS) via cellular telephone, completion of an electronic form/entry screen made available online, or any other suitable means available, including verbally (via telephone). Confirmation of the number of charges and/or the individual amounts of the multiple charges serves to confirm authorisation of the transaction, which may in turn serve as an authorisation or trigger for the merchant 220 to release or ship the relevant item/s to the purchaser 210.

In an alternative embodiment, it is incumbent on the purchaser 210 to check the account relating to his/her financial instrument after making the request 212 to determine the number of charges made and/or the amount of each charge (i.e., without being prompted to do so).

Figure 1C:
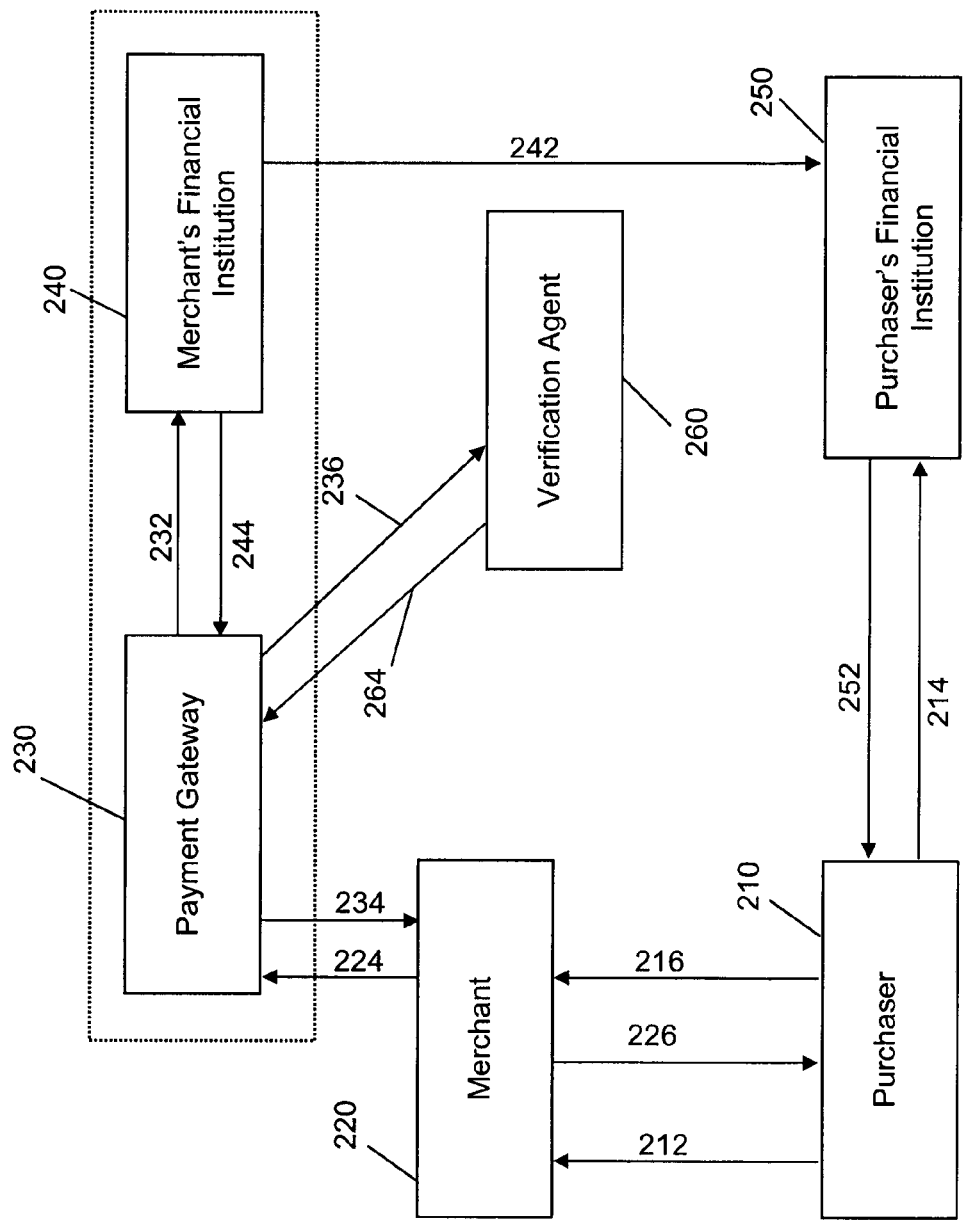
FIG. 1C is a schematic block diagram of a system for verifying transactions or authorisation of transactions in accordance with another embodiment of the present invention.

FIG. 1C is a schematic block diagram of another system for verifying transactions or authorisation of transactions.

The system of FIG. 1C is substantially similar to the system of FIG. 1B. However, the verification agent 260 is coupled to the payment gateway 230 instead of the merchant 220. That is, the communications 222 and 262 in FIG. 1B are replaced by the communications 236 and 264, respectively, in FIG. 1C. The other elements of the system of FIG. 1C are identical or substantially similar to the corresponding elements of the system of FIG. 1B. Specifically, elements having the same reference designators in FIGS. 1B and 1C have identical, equivalent, or similar functionality. In an alternative embodiment to that shown in FIG. 1C, the purchaser 210 may advise or confirm the individual amounts of each of the multiple charges directly to the verification agent 260 (i.e., not via the merchant 220 and/or the payment gateway 230).

In yet another embodiment, the verification agent 260 may be coupled to the merchant's financial institution 240 instead of the payment gateway 230 or the merchant 220.

In yet another embodiment, the verification agent 260 may be practised as an independent computer server accessible to the computer systems of any of the merchant 220, the payment gateway 230, or the merchant's financial institution 240 via the Internet.

Figure 1D:
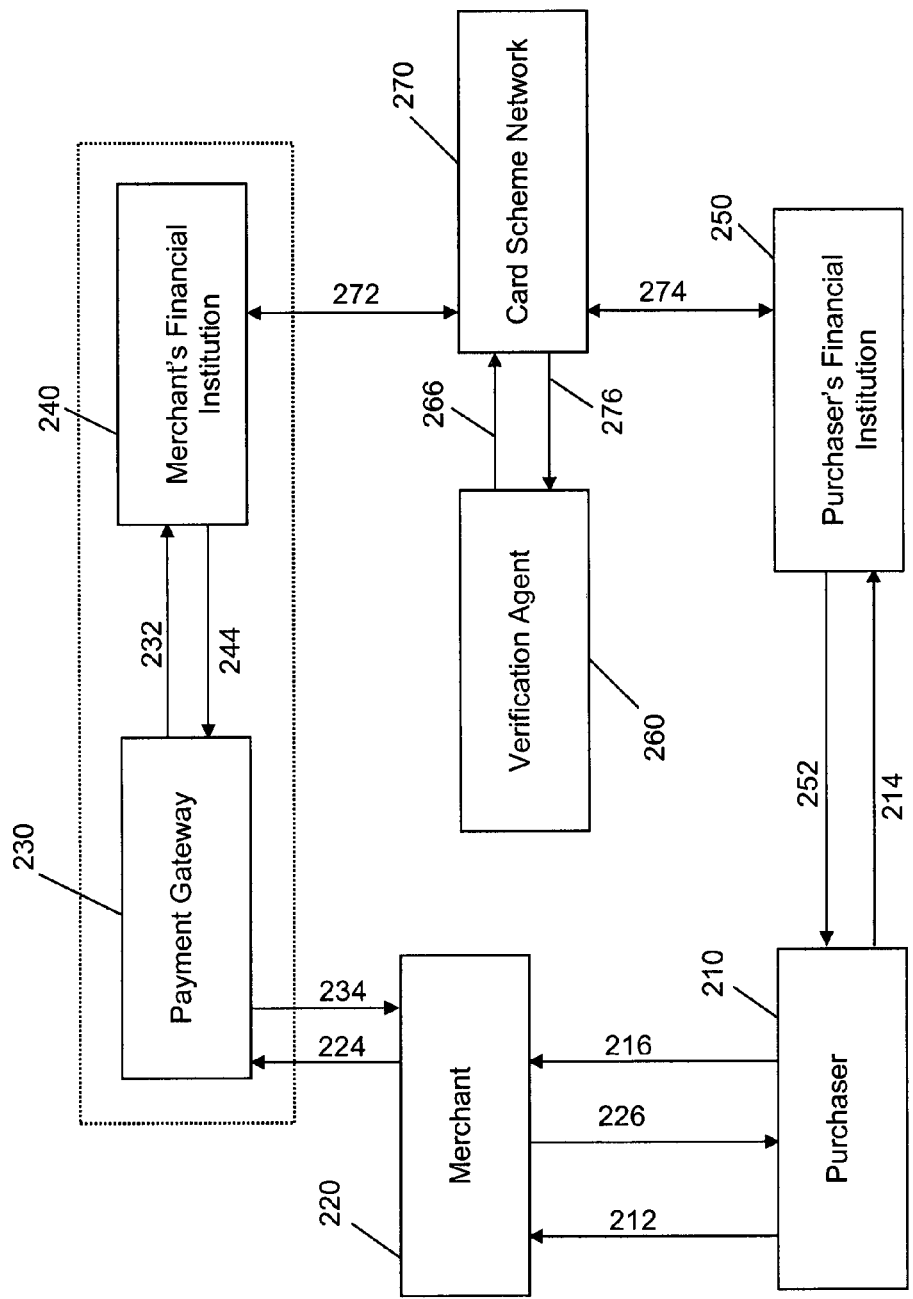
FIG. 1D is a schematic block diagram of a system for verifying transactions or authorisation of transactions in accordance with another embodiment of the present invention.

FIG. 1D is a schematic block diagram of another system for verifying transactions or authorisation of transactions.

The system of FIG. 1D is substantially similar to the system of FIG. 1C, but also shows a card scheme network 270 (e.g., Visa, MasterCard®, American Express®, etc.) communicatively coupled to the verification agent 260, the merchant's financial institution 240 and the purchaser's financial institution 250. The verification agent 260 facilitates debiting of the multiple charge amounts via communications 266, 276 with the card scheme network 270, which processes the funds transfer via bi-directional communications 244 and 254 with the merchant's financial institution 240 and the purchaser's financial institution 250, respectively. Elements having the same reference designators in FIGS. 1B, 1C and 1D have identical, equivalent, or similar functionality.

In yet another embodiment, the verification agent 260 may be coupled to the merchant's financial institution 240 or the card scheme network 270 instead of to the payment gateway 230 or the merchant 220.

In yet another embodiment, the verification agent 260 may be practised as an independent computer server accessible to the computer systems of any of the merchant 220, the payment gateway 230, the merchant's financial institution 240, or the card scheme network 270 via the Internet.

Figure 1E:
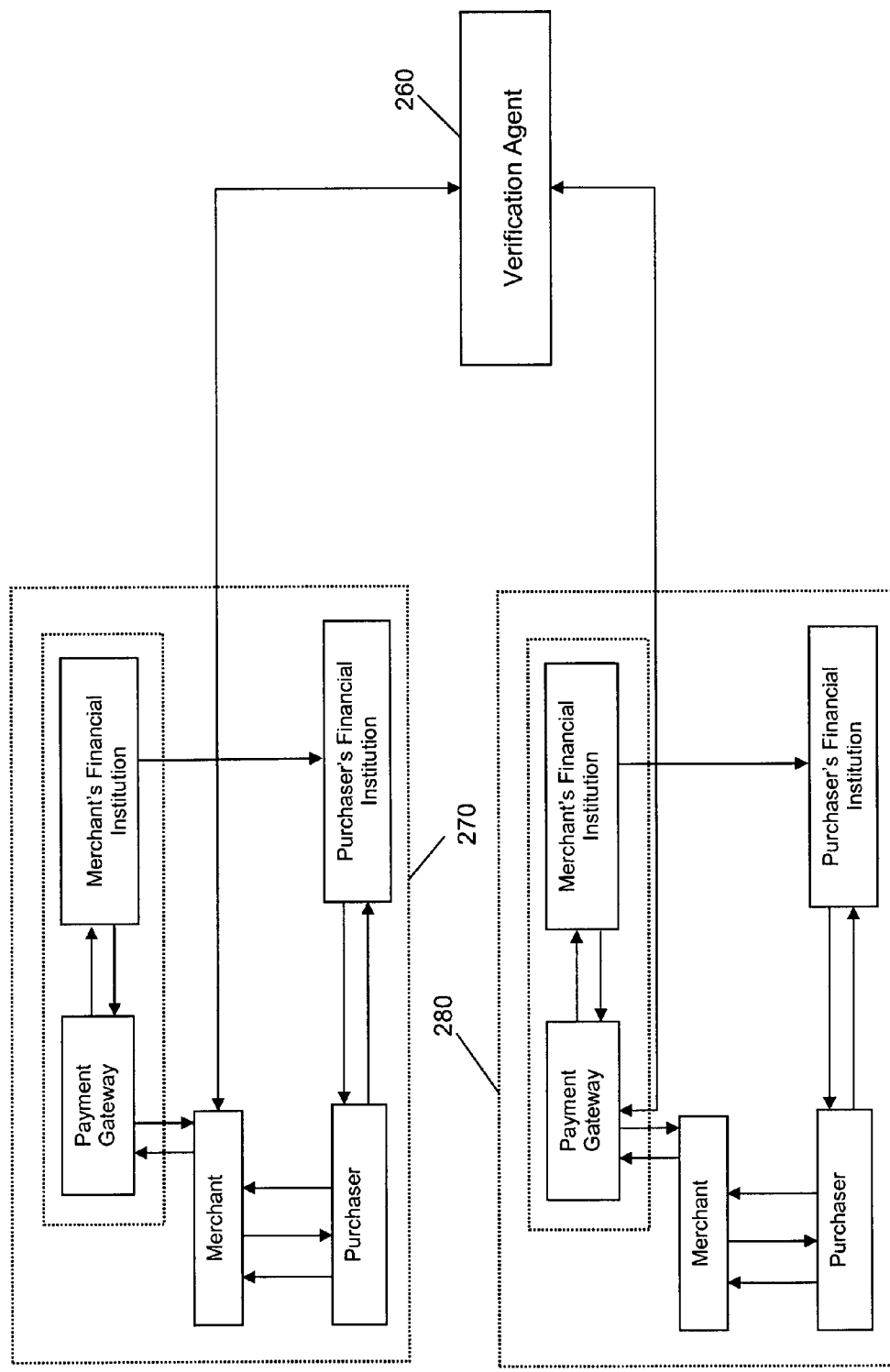
FIG. 1E is a schematic block diagram of a system for verifying transactions or authorisation of transactions in accordance with another embodiment of the present invention.

FIG. 1E is a schematic block diagram of another system for verifying transactions or authorisation of transactions.

FIG. 1E includes an independent verification agent 260 communicatively coupled to systems 270 and 280, which correspond to the systems of FIGS. 1B and 1C, respectively. The verification agent 260 in FIG. 1E typically comprises a computer software application resident and executing on a computer server that is independent of the computer systems of purchasers, merchants, payment gateways, and purchaser and/or merchant financial institutions.

Figure 1F:
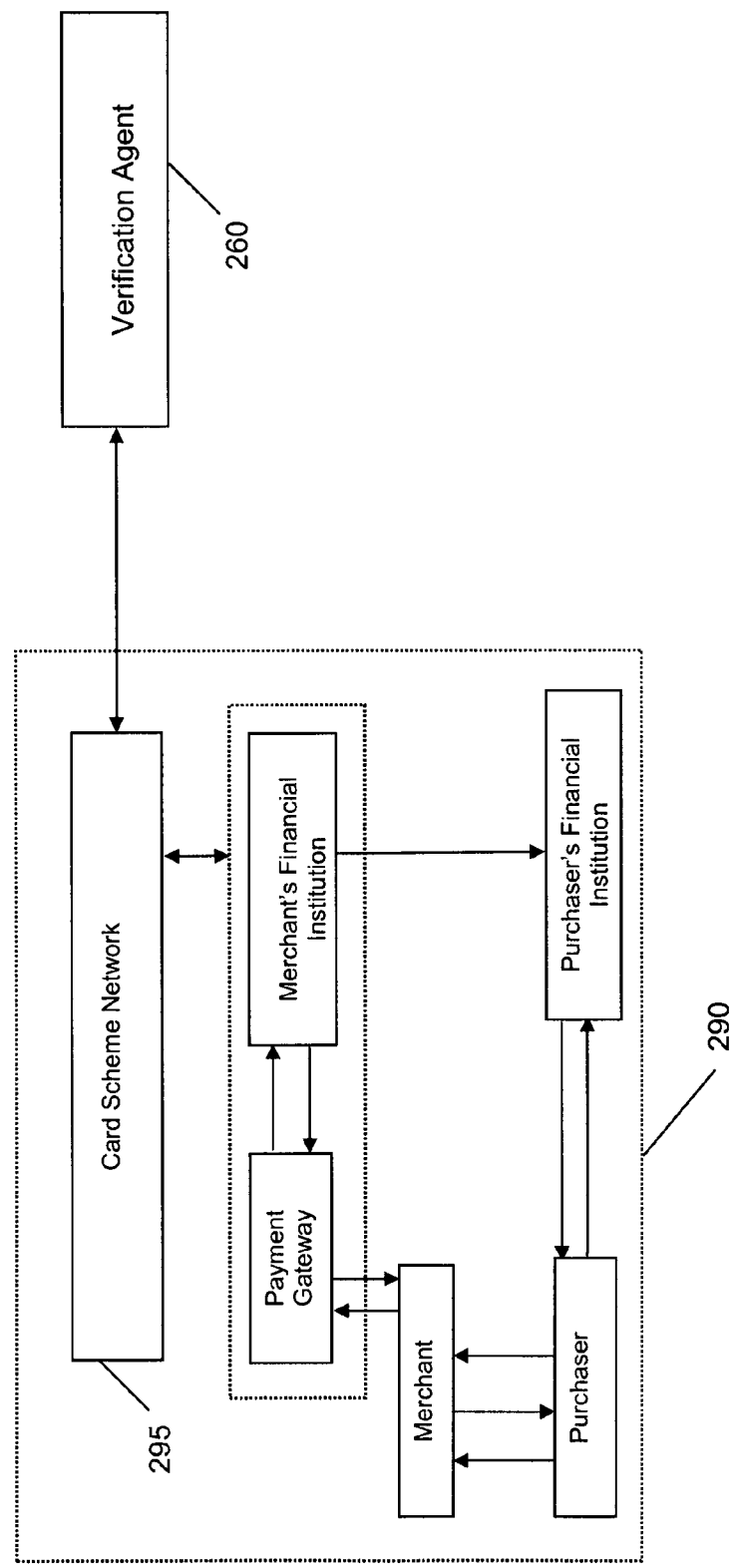
FIG. 1F is a schematic block diagram of a system for verifying transactions or authorisation of transactions in accordance with another embodiment of the present invention.

FIG. 1F is a schematic block diagram of another system for verifying transactions or authorisation of transactions.

The system of FIG. 1F is substantially similar to the system of FIG. 1E. The system of FIG. 1F also includes an independent verification agent 260 communicatively coupled to system 290, which is similar to the systems 270 and 280 of FIGS. 1B and 1C, respectively. However, a card scheme network 295 (e.g., Visa, MasterCard®, American Express®, JCB etc.) is shown interposed between the merchant's financial institution and the verification agent 260. As in FIG. 1E, the verification agent 260 in FIG. 1F typically comprises a computer software application resident and executing on a computer server that is independent of the computer systems of purchasers, merchants, payment gateways, purchaser and/or merchant financial institutions, and the card scheme network.

It should be noted that the payment gateway and merchant's financial institution may be the same or different organisations. However, when depicted in various figures hereinafter, the payment gateway and/or the merchant's financial institution represent the organisation(s) nominated by the merchant for the purposes of electronic processing of transactions using purchaser's financial instruments. It should further be noted that this document does not describe full intercommunications between the various clearing houses, payment gateways, card scheme networks and financial institutions as this may vary according to location and is known by those skilled in the relevant arts.

The verification agent does not necessarily provide payment processing services and generally operates in conjunction with third party payment gateways, financial institutions; card scheme networks and/or clearing houses. Furthermore, details of the actual financial instrument used to process a transaction (e.g., card number, card holder's name, etc.) are not required to be known by the verification agent as each transaction may be processed on a case-by-case basis with reference only to the transaction itself, irrespective of the financial instrument type or source.

Optional integration of a verification agent in accordance with embodiments of the present invention into existing authorisation, clearing, and settlement processes of the financial institutions and/or the card scheme network advantageously have the potential to reduce costs associated with processing credit card transactions. Card scheme networks and financial institutions generally implement a three-stage process for credit card payments, namely: 1) authorisation, 2) clearing, and 3) settlement. Embodiments of the present invention may advantageously be integrated into the authorisation and clearing stages, thereby reducing overall processing costs. Accordingly, transactions are not settled between the merchant's and cardholder's financial institutions if verification is not achieved. This advantageously results in reduced inter-bank processing and fewer 'chargebacks' (process used to recover funds transferred inter-bank).

Information that may be transmitted and/or stored by the verification agent on a per-transaction basis may optionally include, but is not limited to, the following:
   Date and time of original transaction;
   Merchant identifier;
   Gateway identifier;
   Purchaser's financial institution identifier;
   Transaction identifier (allocated by the merchant, gateway, or verification agent);
   Predetermined amount of charge;
   Card scheme network identifier (e.g., Visa, MasterCard®, American Express®, etc.);
   Unique purchaser identifier (allocated independently of the financial instrument account details by the verification agent, merchant, or gateway);
   Financial instrument country of issue;
   Financial instrument currency;
   Exchange rate applied to transaction;
   IP address of purchaser during transaction, as relayed by merchant or gateway;
   Purchaser's email address;
   Purchaser's phone number, being a SMS or MMS enabled telephone;
   Amounts of multiple charges provided by purchaser;
   Date and time multiple charge amounts provided by purchaser;
   Purchaser's IP address and/or email address and/or Instant Messaging address or other electronically routable addresses used during purchaser's provision of multiple charge amounts;
   Purchaser's phone contact details, being a SMS or MMS or similar message enabled telephone used or nominated by the purchaser when providing amounts of multiple charges;
   Acquired MAC Address, IMEI, ESN, Serial Number or other hard coded data fixed to a device used by purchaser when providing the amounts of the multiple charges;
   Purchaser's Personal Identification Number (PIN) nominated when providing amounts of multiple charges.

Figure 2A:
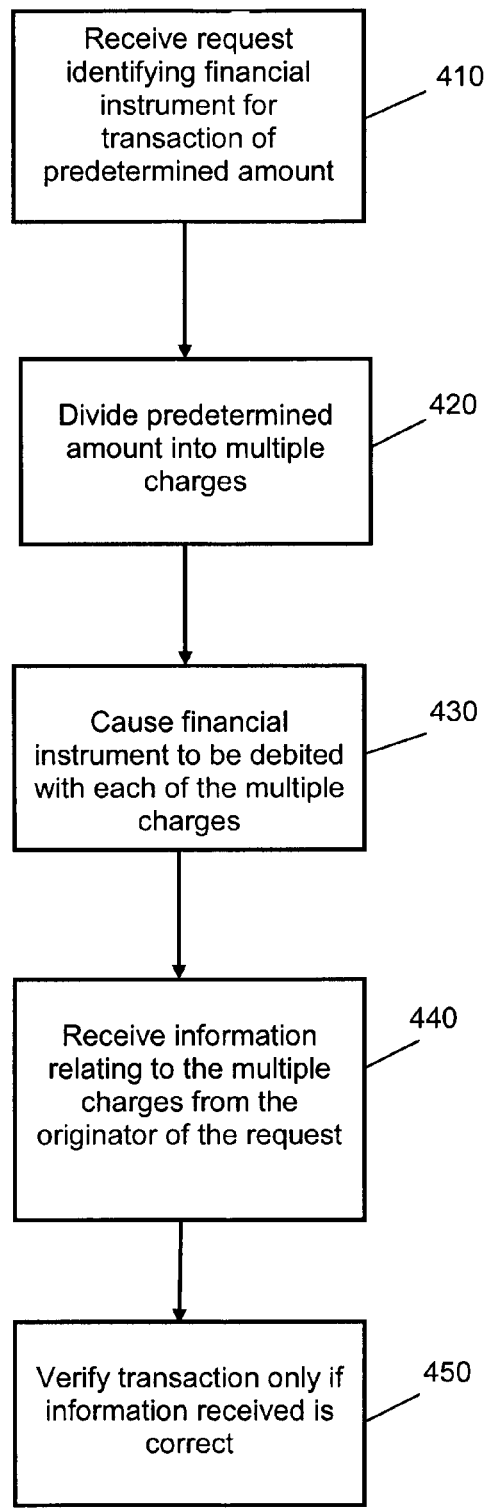
FIG. 2A is a flow diagram of a method for verifying transactions or authorisation of transactions in accordance with an embodiment of the present invention.

FIG. 2A is a flow diagram of a computer-implemented method for verifying transactions or authorisation of transactions.

Referring to FIG. 2A, a request to process an electronic transaction for a predetermined amount of money is received at step 410. The request comprises data identifying a particular financial instrument nominated by the originator of the request.

At step 420, the predetermined amount is divided into a plurality of charges such that the sum of the individual amounts of the plurality of charges is equal to the predetermined amount of money (i.e., the total transaction amount). The number of individual charges and the relevant amounts are preferably determined or selected on a random basis (e.g., by way of a computer software program employing a pseudo-random generator). The number of individual charges and the relevant amounts are stored for later retrieval.

At step 430, the nominated financial instrument is separately debited with each of the plurality of charges.

At step 440, confirmation of the plurality of charges (i.e., the number of separate charges and/or the respective amounts) is received from the originator of the request. That is, the originator obtains the number of separate charges and/ or the respective amounts by accessing his/her account relating to the financial instrument and forwards this information for verification. Provided that the confirmation information received in step 440 is correct, the transaction is verified at step 450. In determining whether the information received in step 440 is correct, the number of individual charges and/or the respective amounts as received from the purchaser) is/are compared to the number of charges and/or the respective amounts as determined in step 420.

Figure 2B:
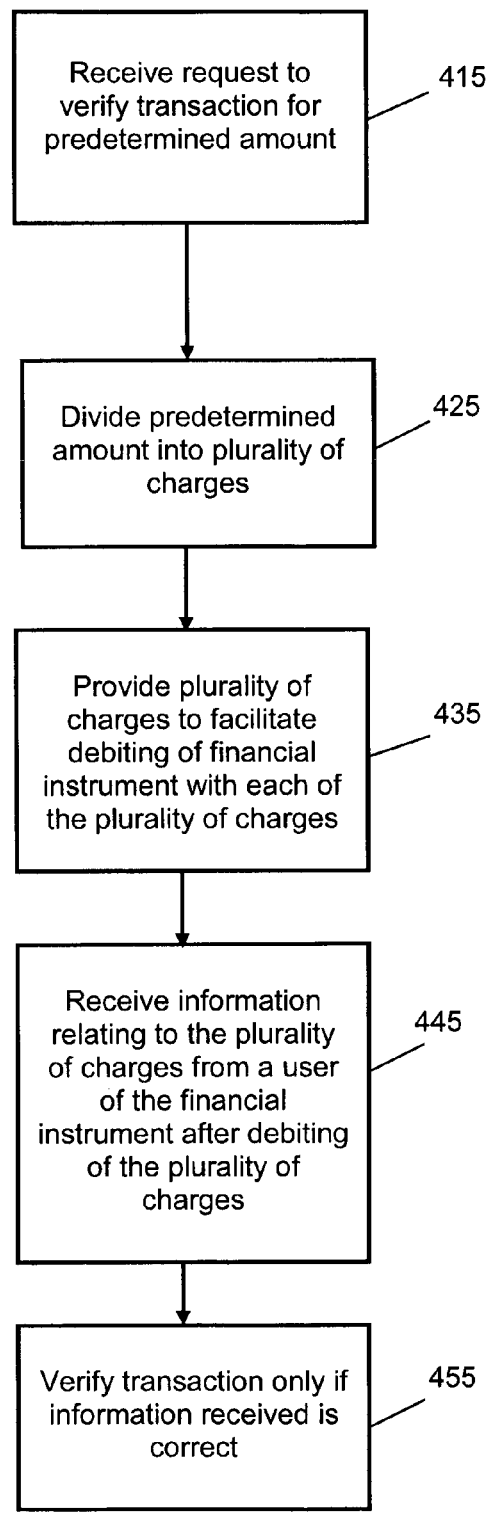
FIG. 2B is a flow diagram of a method for verifying transactions or authorisation of transactions in accordance with another embodiment of the present invention.

FIG. 2B is a flow diagram of a computer-implemented method for verifying transactions.

Referring to FIG. 2B, a request to verify an electronic transaction for a predetermined amount of money is received at step 415.

At step 425, the predetermined amount is divided into a plurality of charges such that the sum of the individual amounts of the plurality of charges is equal to the predetermined amount of money (i.e., the total transaction amount). The number of individual charges and the relevant amounts are preferably determined or selected on a random basis (e.g., by way of a computer software program employing a pseudo-random generator). The number of individual charges and the relevant amounts are stored for later retrieval.

At step 435, the multiple charges (e.g., the amounts) are provided to an entity to facilitate debiting of a financial instrument.

At step 445, confirmation of the plurality of charges (i.e., the number of separate charges and/or the respective amounts) is received. This information originates from the user of the financial instrument and is typically obtained by the user accessing his/her account relating to the financial instrument.

Provided that the confirmation information received in step 445 is correct, the transaction is verified at step 455. In determining whether the information received in step 445 is correct, the number of individual charges and/or the respective amounts as received from the user of the financial instrument) is/are compared to the number of charges and/or the respective amounts as determined in step 425.

The methods and systems described hereinbefore with reference to FIGS. 2A and 2B may advantageously be practised for cross currency transactions (i.e., transactions in which the currency of issue or operation of a particular financial instrument (e.g., credit card, debit card, charge, card, bank account, etc.) is different to the currency of the transaction (as processed by the merchant)). A particular disadvantage of conventional cross-currency transactions, which typically only settle several days after occurrence of the actual transaction, is that the exchange rate applied is not contemporaneously known to the purchaser (e.g., a cardholder) and the merchant.

The plurality of charges that sum to the predetermined transaction amount are stored by the verification agent and are later compared to the values supplied by the purchaser for authentication purposes. The plurality of charges are preferably stored as charge ratios relative to the predetermined amount (i.e., the total transaction amount) for later matching with the values supplied by the purchaser. The values received by the verification agent from the purchaser are modified by the exchange rate between the currency of the financial instrument (i.e., the purchaser's currency) and the currency of the merchant (i.e., the currency of the price of the advertised item or product). Each of the values supplied by the purchaser (e.g., from his/her bank statement) are converted by the verification agent into value ratios by dividing each of the plurality of received values, respectively, by the sum of the plurality of received values. The value ratios are compared to the stored charge ratios and the transaction is authenticated or verified if each of the value ratios matches a respective stored charge ratio within a predefined margin of error or error tolerance (i.e., due to rounding).

Each of the plurality of charges is converted to a ratio and stored as a stored charge value ratio (SV) as follows:

$$SV_1 = Value_1 / (\text{Predetermined Amount})$$

$$SV_2 = Value_2 / (\text{Predetermined Amount})$$

...

...

$$SV_N = Value_N / (\text{Predetermined Amount})$$

wherein:
 Value$_1$, Value$_2$ ... Value$_N$ are the plurality of charges;
 Predetermined Amount is the total amount of the transaction; and
 Sum($\Sigma$) [Value$_1$, Value$_2$ ... Value$_N$] is equal to the predetermined amount, as stored in the currency of the original transaction (i.e., the merchant's currency).

The sum of the stored ratios, Sum($\Sigma$) [SV$_1$ SV$_2$ ... SV$_N$]=1.

The purchaser's response comprises a plurality of response values (RV) corresponding to the plurality of charges, but modified by the relevant exchange rate of the day (i.e., the current exchange rate between the currency of the financial instrument used and the currency of the transaction OD. Note that exchange rate ($\beta$) need not be known and is generally not known as part of the process, and the process mathematically eliminates the requirement to know ($\beta$) in order to compare stored versus received values.

Upon receipt of the purchaser's response, the plurality of response values are converted to purchaser response ratios (PR) as follows:

$$PR_1 = RV_1 / \sum (RV_1, RV_2 ... RV_N)$$

$$PR_2 = RV_2 / \sum (RV_1, RV_2 ... RV_N)$$

...

...

$$PR_N = RV_N / \sum (RV_1, RV_2 ... RV_N)$$

wherein:
 RV$_1$, RV$_2$ ... RV$_N$ are the plurality of response values received from the purchaser and are related to the plurality of charges
 Value$_1$, Value$_2$ ... Value$_N$ by the factor ($\beta$)
 PR$_1$, PR$_2$ ... PR$_N$ are the plurality of purchaser response ratios; and
 Sum($\Sigma$) [PR$_1$, PR$_2$ ... PR$_N$]~1 subject to an error tolerance ($\epsilon$).

Now, if SV$_1$ is equal, within a predefined error tolerance ($\epsilon$), to any one of PR$_1$ to PR$_N$ then this is considered to be a correct response for predetermined Value$_1$ for the purpose of verification. A similar process is performed for all the remaining stored ratios by comparing and matching SV$_2$ through SV$_N$ to a corresponding similar response ratio PR$_2$ through PR$_N$ subject to the error tolerance ($\epsilon$)

Each stored value (SV) must be assigned a corresponding PR value until all are exhausted. In the event that there is a mismatch in values or the actual number of SV's to PR's, then the authentication process will result in a fail.

Further, the exchange rate applied to the transaction may be calculated to within a reasonable error tolerance ($\epsilon$) by dividing the predetermined amount by the sum of the purchaser responses.

Advantageously, the comparison of stored ratios, calculated using the plurality of charges as numerators and the predetermined amount as the denominator, with the response ratios calculated by using the response values as numerators and the sum of the total of the response values as the denominator, mathematically eliminates the requirement to know the exchange rate factor ($\beta$) in advance or as part of the process.

EXAMPLE

A merchant offers a product for sale for US$105. A purchaser agrees to purchase the product for US$105 and enters the details of their financial instrument (data) into the merchant's website. The data is passed to the verification agent, which splits the US$105 (i.e., the predetermined amount) into two separate charges using a random number generator, for example, US$59.99 and US$45.01. The sum of the two separate charges is equal to US$105 (i.e., the predetermined amount). The verification agent stores the two separate charges as amounts and as ratios: US$59.99/US$105= 0.571333333 and US$40.01/US$105=0.381047619.

The purchaser's financial instrument, however, is in another currency so the actual amounts shown on the purchaser's bank statement will be modified by the exchange rate of the day ($\beta$) for that currency: $59.99$\beta$ and $40.01$\beta$, respectively. The predetermined amount will also be modified by the exchange rate. The purchaser will thus respond to the verification agent with two numerical amounts that differ in absolute numerical value, but that are the same relative ratio to the predetermined amount, namely $59.99$\beta$ and $45.01$\beta$ The verification agent then calculates the following ratios relative to the modified predetermined amount:

$$\$59.99\beta/(\$59.99\beta+\$45.01\beta)=0.571333333;\text{ and}$$

$$\$45.01\beta/(\$59.99\beta+\$45.01\beta)=0.381047619.$$

As can be noted, the $\beta$ variable is mathematically factored out (i.e., removed), leaving the relative ratios only, subject to computational rounding errors. To further illustrate, if the currency of the merchant is the same as the purchaser's currency, then $\beta$ will be equal to unity (1), as the PR values will exactly equal the SV values.

Figure 2C:
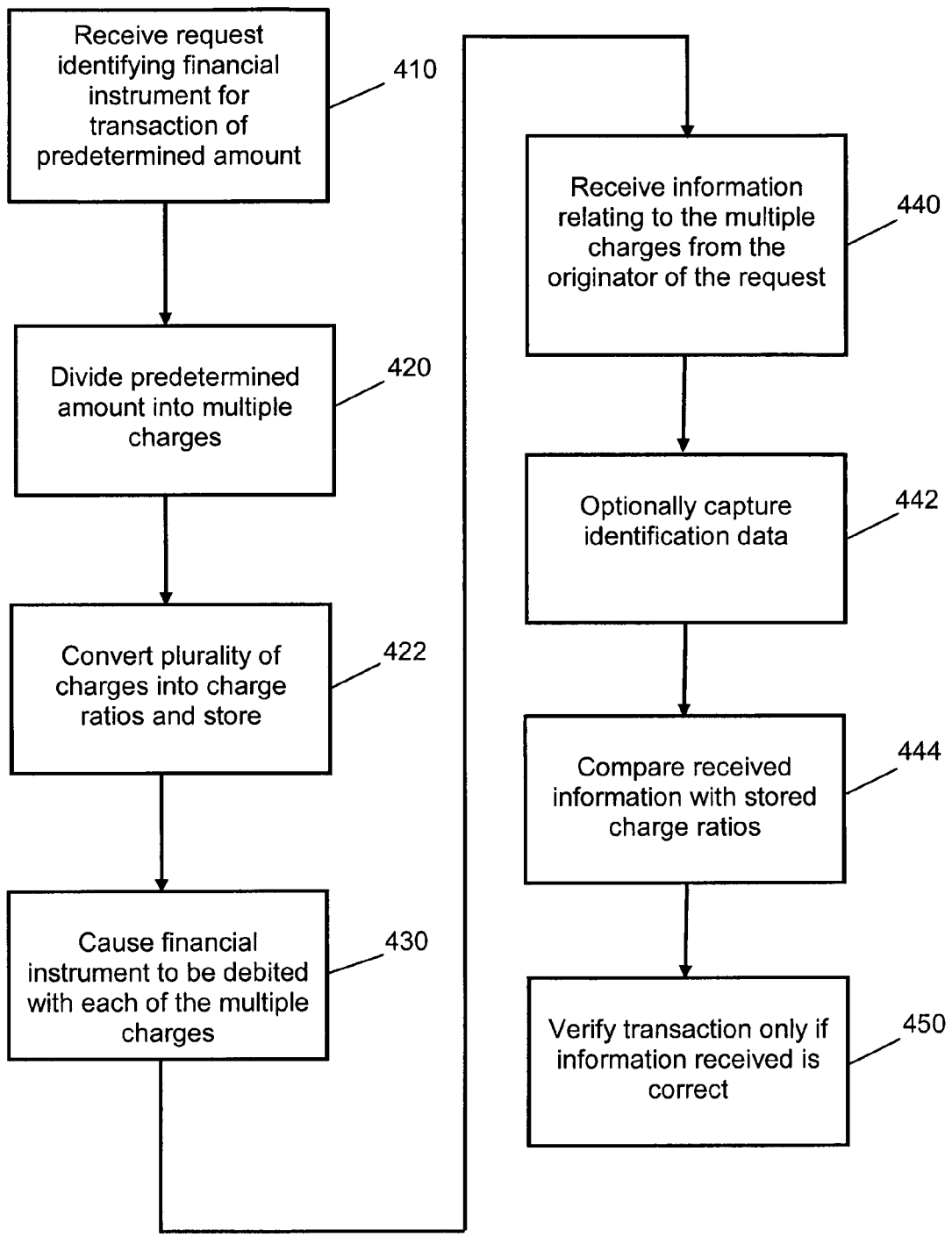
FIG. 2C is a flow diagram of a method for verifying cross-currency transactions or authorisation of cross-currency transactions in accordance with another embodiment of the present invention.

FIG. 2C is a flow diagram of a computer-implemented method for verifying cross-currency transactions or authorisation of cross-currency transactions. The method of FIG. 2C is similar to the method of FIG. 2A, apart from the addition of steps 422, 442, and 444, which relate specifically to the cross-currency aspect. In step 422, the plurality of charges are converted to charge ratios by dividing each of the plurality of charges by the predetermined amount and stored. In step 444, the stored charge ratios are compared to the information received from the originator of the request (i.e., the purchaser) for performing verification of the transaction. The information received from the originator of the request comprises a plurality of values which correspond to the plurality of charges each modified by an exchange rate (i.e., the exchange rate between the purchaser's currency and the merchant's currency). The plurality of values are typically retrieved from the originator's bank statement and transmitted to the verification agent for authentication or verification. Before performing the comparison, the plurality of values are first converted to respective ratios by dividing each of the plurality of values by the sum of the plurality of values. The transaction is verified or authenticated if each of the value ratios match a respective stored charge ratio within a predefined margin of error. Step 442 is an optional step, in which identification data is captured (e.g., IP address, serial numbers, MAC address, IMEI address, etc.) and linked to the transaction and authentication of the payer (purchaser).

Figure 2D:
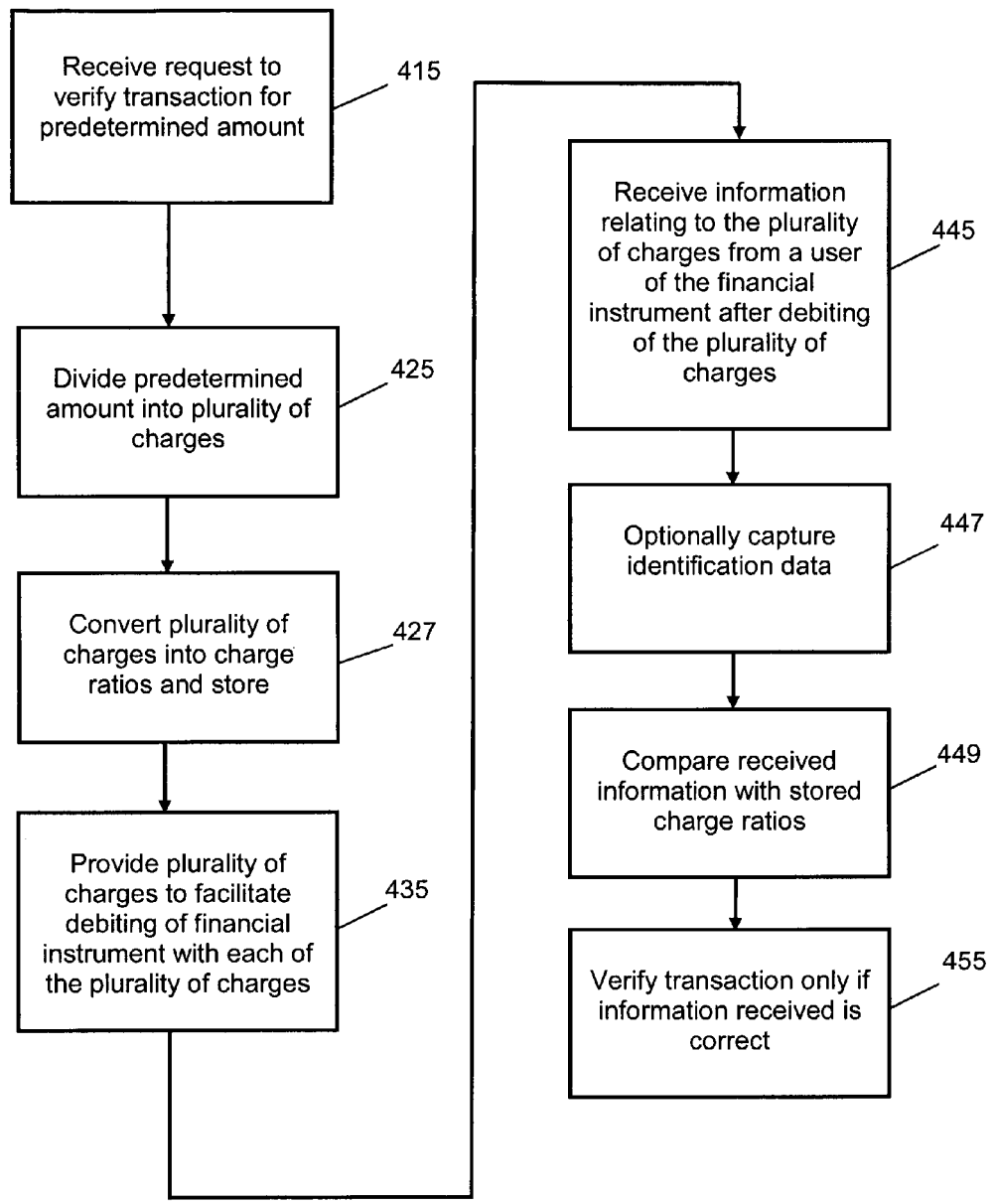
FIG. 2D is a flow diagram of a method for verifying cross-currency transactions or authorisation of cross-currency transactions in accordance with another embodiment of the present invention.

FIG. 2D is a flow diagram of a computer-implemented method for verifying cross-currency transactions. The method of FIG. 2D is similar to the method of FIG. 2B, apart from the addition of steps 427, 447, and 449, which relate specifically to the cross-currency aspect. In step 427, the plurality of charges are converted to charge ratios by dividing each of the plurality of charges by the predetermined amount and stored. In step 449, the stored charge ratios are compared to the information received from the originator of the request (i.e., the purchaser) for performing verification of the transaction. The information received from the originator of the request comprises a plurality of values which correspond to the plurality of charges each modified by an exchange rate (i.e., the exchange rate between the purchaser's currency and the merchant's currency). The plurality of values are typically retrieved from the originator's bank statement and transmitted to the verification agent for authentication or verification. Before performing the comparison, the plurality of values are first converted to respective ratios by dividing each of the plurality of values by the sum of the plurality of values. The transaction is verified or authenticated if each of the value ratios match a respective stored charge ratio within a predefined margin of error. Step 447 is an optional step, in which identification data is captured (e.g., IP address, serial numbers, MAC address, IMEI address, etc.) and linked to the transaction and authentication of the payer (purchaser).

The methods described hereinbefore with reference to FIGS. 2A, 2B, 2C and 2D are typically performed by a verification agent, also as described hereinbefore.

Figure 3A:
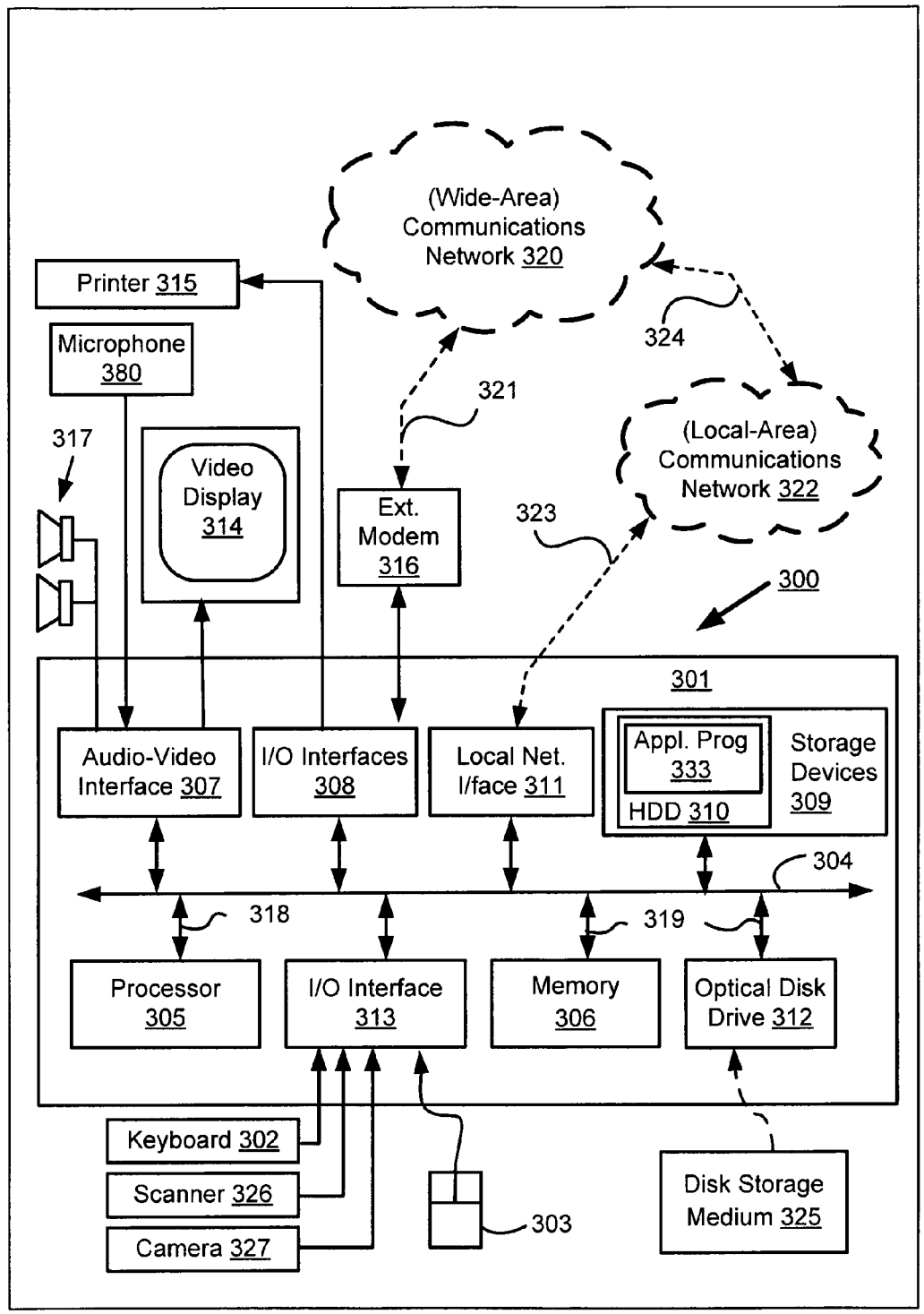
FIGS. 3A and 3B are schematic block diagrams of a computer system with which embodiments of the present invention may be practised.
Figure 3B:
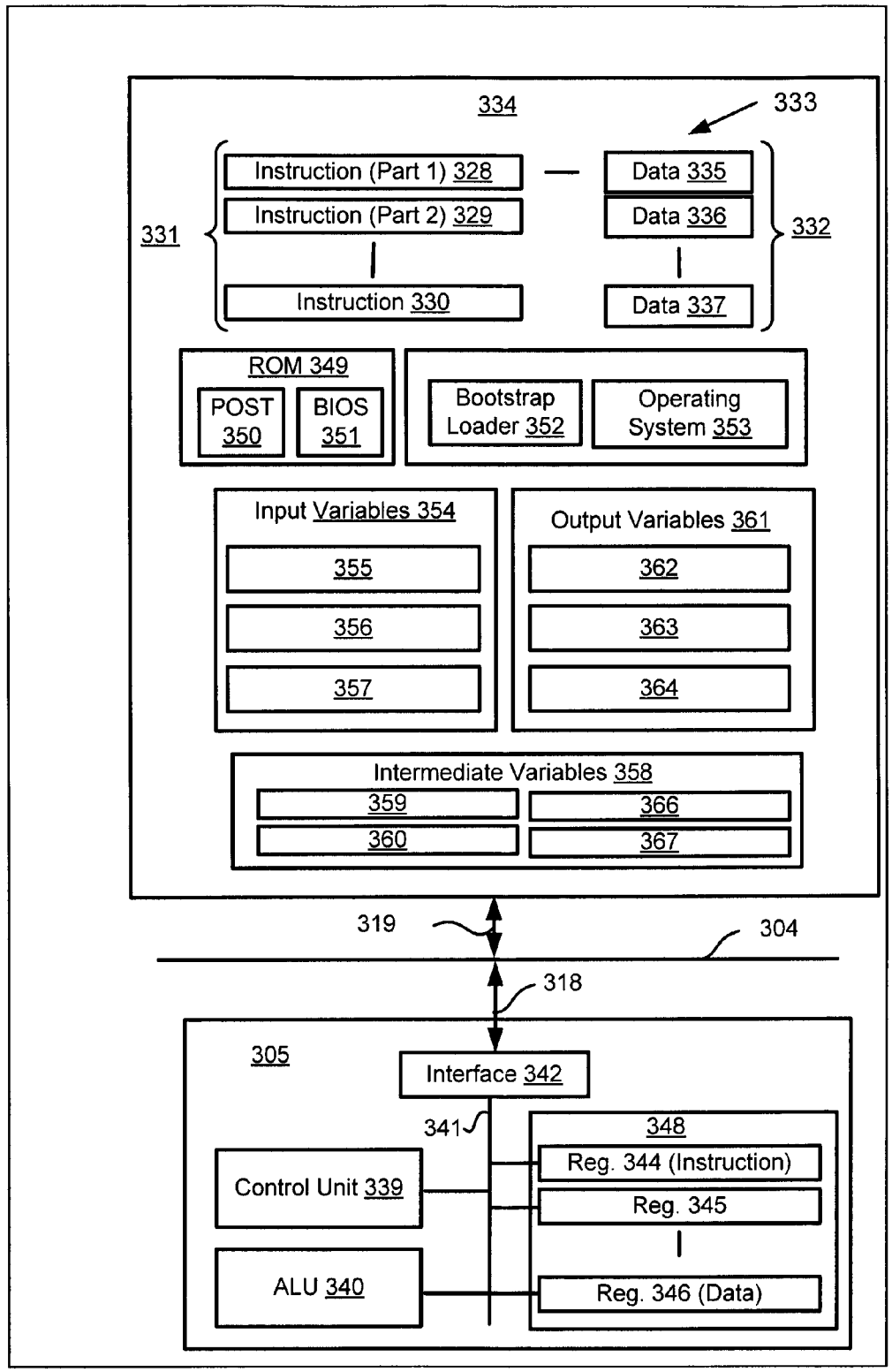

FIGS. 3A and 3B depict a general-purpose computer system 300, with which the various arrangements described herein can be practiced.

As seen in FIG. 3A, the computer system 300 includes: a computer module 301; input devices such as a keyboard 302, a mouse pointer device 303, a scanner 326, a camera 327, and a microphone 380; and output devices including a printer 315, a display device 314 and loudspeakers 317. An external Modulator-Demodulator (Modem) transceiver device 316 may be used by the computer module 301 for communicating to and from a communications network 320 via a connection 321. The communications network 320 may be a wide-area network (WAN), such as the Internet, a cellular telecommunications network, or a private WAN.

Where the connection 321 is a telephone line, the modem 316 may be a traditional "dial-up" modem. Alternatively, where the connection 321 is a high capacity (e.g., cable) connection, the modem 316 may be a broadband modem. A wireless modem may also be used for wireless connection to' the communications network 320.

The computer module 301 typically includes at least one processor unit 305, and a memory unit 306.For example, the memory unit 306 may have semiconductor random access memory (RAM) and semiconductor read only memory (ROM). The computer module 301 also includes an number of input/output (I/O) interfaces including: an audio-video interface 307 that couples to the video display 314, loudspeakers 317 and microphone 380; an I/O interface 313 that couples to the keyboard 302, mouse 303, scanner 326, camera 327 and optionally a joystick or other human interface device (not illustrated); and an interface 308 for the external modem 316 and printer 315. In some implementations, the modem 316 may be incorporated within the computer module 301, for example within the interface 308. The computer module 301 also has a local network interface 311, which permits coupling of the computer system 300 via a connection 323 to a local-area communications network 322, known as a Local Area Network (LAN). As illustrated in FIG. 3A, the local communications network 322 may also couple to the wide network 320 via a connection 324, which would typically include a so-called "firewall" device or device of similar functionality. The local network interface 311 may comprise an Ethernet™ circuit card, a Bluetooth™ wireless arrangement or an IEEE 802.11 wireless arrangement; however, numerous other types of interfaces may be practiced for the interface 311.

The I/O interfaces 308 and 313 may afford either or both of serial and parallel connectivity, the former typically being implemented according to the Universal Serial Bus (USB) standards and having corresponding USB connectors (not illustrated). Storage devices 309 are provided and typically include a hard disk drive (HDD) 310. Other storage devices such as a floppy disk drive and a magnetic tape drive (not illustrated) may also be used. An optical disk drive 312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 300.

The components 305 to 313 of the computer module 301 typically communicate via an interconnected bus 304 and in a manner that results in a conventional mode of operation of the computer system 300 known to those in the relevant art. For example, the processor 305 is coupled to the system bus 304using a connection 318. Likewise, the memory 306 and optical disk drive 312 are coupled to the system bus 304 by connections 319. Examples of computers on which the described arrangements can be practised include IBM-PC's and compatibles, Sun Sparcstations, Apple Mac™ or similar computer systems.

The method of verifying authorisation of a transaction as described hereinbefore may be implemented using the computer system 300 wherein the processes of FIGS. 1 and 2 may be implemented as one or more software application programs 333 executable within the computer system 300. In particular, the steps of the method of verifying an electronic transaction are effected by instructions 331 (see FIG. 3B) in the software 333 that are carried out within the computer system 300. The software instructions 331 may be formed as one or more code modules, each for performing one or more particular tasks. The software may also be divided into two separate parts, in which a first part and the corresponding code modules performs the transaction verification methods and a second part and the corresponding code modules manage a user interface between the first part and the user.

The software may be stored in a computer readable medium, including the storage devices described below, for example. The software is loaded into the computer system 300 from the computer readable medium, and then executed by the computer system 300. A computer readable medium having such software or computer program recorded on the computer readable medium is a computer program product. The use of the computer program product in the computer system 300 preferably effects an advantageous apparatus for verifying electronic transactions.

The software 333 is typically stored in the HDD 310 or the memory 306. The software is loaded into the computer system 300 from a computer readable medium, and executed by the computer system 300. Thus, for example, the software 333 may be stored on an optically readable disk storage medium (e.g., CD-ROM) 325 that is read by the optical disk drive 312. A computer readable medium having such software or computer program recorded on it is a computer program product. The use of the computer program product in the, computer system 300 preferably effects an apparatus for verifying electronic transactions.

In some instances, the application programs 333 may be supplied to the user encoded on one or more CD-ROMs 325 and read via the corresponding drive 312, or alternatively may be read by the user from the networks 320 or 322. Still further, the software can also be loaded into the computer system 300 from other computer readable media. Computer readable storage media refers to any storage medium that provides recorded instructions and/or data to the computer system 300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 301. Examples of computer readable transmission media that may also participate in the provision of software, application programs, instructions and/or data to the computer module 301 include radio or infra-red transmission channels as well as a network connection to another computer or networked device, and the Internet or Intranets including e-mail transmissions and information recorded on Websites and the like.

The second part of the application programs 333 and the corresponding code modules mentioned above may be executed to implement one or more graphical user interfaces (GUIs) to be rendered or otherwise represented upon the display 314. Through manipulation of typically the keyboard 302 and the mouse 303; a user of the computer system 300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 317 and user voice commands input via the microphone 380. FIG. 3B is a detailed schematic block diagram of the processor 305 and a "memory" 334. The memory 334 represents a logical aggregation of all the memory modules (including the HDD. 309 and semiconductor memory 306) that can be accessed by the computer module 301 in FIG. 3A.

When the computer module 301 is initially powered up, a power-on self-test (POST) program 350 executes. The POST program 350 is typically stored in a ROM 349 of the semiconductor memory 306 of FIG. 3A. A hardware device such as the ROM 349 storing software is sometimes referred to as firmware. The POST program 350 examines hardware within the computer module 301 to ensure proper functioning and typically checks the processor 305, the memory 334 (309, 306), and a basic input-output systems software (BIOS)module 351, also typically stored in the ROM 349, for correct operation. Once the. POST program 350 has run successfully, the BIOS 351 activates the hard disk drive 310 of FIG. 3A. Activation of the hard disk drive 310 causes a bootstrap loader program 352 that is resident on the hard disk drive 310 to execute via the processor 305. This loads an operating system 353 into the RAM memory 306, upon which the operating system 353 commences operation. The operating system 353 is a system level application, executable by the processor 305, to fulfill various high level functions, including processor management, memory management, device management, storage management, software application interface, and generic user interface.

The operating system 353 manages the memory 334 (309, 306) to ensure that each process or application running on the computer module 301 has sufficient memory in which to execute without colliding with memory allocated to another process. Furthermore, the different types of memory available in the system 300 of FIG. 3A must be used properly so that each process can run effectively. Accordingly, the aggregated memory 334 is not intended to illustrate how particular segments of memory are allocated (unless otherwise stated), but rather to provide a general view of the memory accessible by the computer system 300 and how such is used.

As shown in FIG. 3B, the processor 305 includes a number of functional modules including a control unit 339, an arithmetic logic unit (ALU) 340, and a local or internal memory 348, sometimes called a cache memory. The cache memory 348 typically includes a number of storage registers 344-346 in a register section. One or more internal busses 341 functionally interconnect these functional modules. The processor 305 typically also has one or more interfaces 342 for communicating with external devices via the system bus 304, using a connection 318. The memory 334 is coupled to the bus 304 using a connection 319.

The application program 333 includes a sequence of instructions 331 that may include conditional branch and loop instructions. The program 333 may also include data 332 which is used in execution of the program 333. The instructions 331 and the data 332 are stored in memory locations 328, 329, 330 and 335, 336, 337, respectively. Depending upon the relative size of the instructions 331 and the memory locations 328-330, a particular instruction may be stored in a single memory location as depicted by the instruction shown in the memory location 330. Alternately, an instruction may be segmented into a number of parts each of which is stored in a separate memory location, as depicted by the instruction segments shown in the memory locations 328 and 329.

In general, the processor 305 is given a set of instructions which are executed therein.

The processor 1105 waits for a subsequent input, to which the processor 305 reacts to by executing another set of instructions. Each input may be provided from one or more of a number of sources, including data generated by one or more of the input devices 302, 303, data received from an external source across one of the networks 320, 302, data retrieved from one of the storage devices 306, 309 or data retrieved from a storage medium 325 inserted into the corresponding reader 312, all depicted in FIG. 3A. The execution of a set of the instructions may in some cases result in output of data. Execution may also involve storing data or variables to the memory 334.

The disclosed transaction verification arrangements use input variables 354, which are stored in the memory 334 in corresponding memory locations 355, 356, 357. The transaction verification arrangements produce output variables 361, which are stored in the memory 334 in corresponding memory locations 362, 363, 364. Intermediate variables 358 may be stored in memory locations 359, 360, 366 and 367.

Referring to the processor 305 of FIG. 3B, the registers 344, 345, 346, the arithmetic logic unit (ALU) 340, and the control unit 339 work together to perform sequences of micro-operations needed to perform "fetch, decode, and execute" cycles for every instruction in the instruction set making up the program 333. Each fetch, decode, and execute cycle comprises:

(a) a fetch operation, which fetches or reads an instruction 331 from a memory location 328, 329, 330;

(b) a decode operation in which the control unit 339 determines which instruction has been fetched; and (c) an execute operation in which the control unit 339 and/or the ALU 340 execute the instruction.

Thereafter, a further fetch, decode, and execute cycle for the next instruction may be executed. Similarly, a store cycle may be performed by which the control unit 339 stores or writes a value to a memory location 332.

Each step or sub-process in the processes of FIGS. 1 and 2 is associated with one or more segments of the program 333 and is performed by the register section 344, 345, 347, the ALU 340, and the control unit 339 in the processor 305 working together to perform the fetch, decode, and execute cycles for every instruction in the instruction set for the noted segments of the program 333.

The payer authentication processes described hereinbefore may also form part of a larger process involving an electronic signature for execution of contracts or records, whereby the authentication process is attached to or logically associated with a contract or other record and executed or adopted by a person with the intent to sign the record. The predetermined sum may, for example: (i) form part of the monetary consideration associated with the contract, (ii) be a payment associated with the execution or lodgment of a contract or record, or iii) be a fee charged individually to any, some or all parties in a contract from a (third party) service provider who acts as an independent authentication provider of electronic signatures. In each case, successful application of the process serves as an attached or associated process for authentication of each party's electronic signature in relation to the contract or record.

Generation of the plurality of charges (which total the predetermined amount) also acts as a system for dynamically generating one time keys which must be provided by the cardholder as a response to a challenge issued by the verification agent in order to authenticate that specific transaction. To access the value of the dynamic keys, the cardholder typically needs to access their existing internet or telephone banking systems and look up and return the value of the keys.

The methods and systems described hereinbefore may advantageously be practised on a per-transaction basis. Unlike other existing systems, pre-registration of users (e.g., customers or purchasers) is not necessary, which substantially increases convenience to users. Furthermore, financial instrument and/or user details are not required to be stored by an intermediary, which advantageously adds to security.

The embodiments described hereinbefore involve debiting as opposed to crediting of a financial instrument. This is advantageous in that financial instruments such as credit and debit cards are debited substantially instantaneously. Crediting of such financial instruments, on the other hand, generally involves longer timeframes due to clearance checks, etc., and is thus much slower and not as flexible or convenient. According to the embodiments described hereinbefore, verification can advantageously be provided substantially instantly after receipt of a user or purchaser request.

The embodiments described hereinbefore involve actual payment transactions to a merchant for good or services rather than dummy initial, pre-authorisation transactions. Such dummy transactions may impact a purchaser's desire to subsequently revisit the merchant and conclude a transaction, and may also be limiting in terms of mitigating fraud. For example, a financial instrument may be pre-authorised by use of a dummy transaction, subsequently lost or stolen, yet still appear as authorised for use until withdrawn by the relevant financial institution. The period between loss and withdrawal is typically the period in which fraud occurs, which makes the pre-authorisation less desirable than if it had not been relied upon.

The embodiments described hereinbefore advantageously use data or information relating to or contained within the transaction to verify the authenticity of the transaction. This data or information is known only to the authorised holder of the relevant financial instrument and the financial instrument holder's financial institution.

In certain embodiments, the methods and systems described herein may be implemented for each and every transaction initiated on a case-by-case or a merchant-by-merchant basis.

In certain embodiments, the methods and systems described herein may be implemented following a set of risk criteria being identified, irrespective of whether the method or system has previously been implemented for the particular financial instrument. The risk criteria may, for example, be determined by the merchant and/or the payment gateway. Such criteria may, for example, include: the product/s or service/s being purchased as part of a transaction identified as being high risk, the product/s or service/s being purchased being over a monetary threshold value, the purchaser's request originating from a IP address outside the range normally associated with the financial instrument or from a financial instrument that has been used to make a high frequency of purchases recently, or otherwise.

Some advantages of one or more embodiments described hereinbefore include:

(i) Full details of the financial instrument itself (e.g., credit card number and/or purchaser's details) do not need to be passed to the verification agent, as the verification agent verifies each unique transaction on a case-by-case basis (i.e., the transaction is assigned a unique identifier that does not necessarily correspond to any details concerning the financial instrument, payment gateway, or merchant). Knowledge of the actual financial instrument details is not necessary to perform verification.

(ii) The verification agent is not susceptible to loss of sensitive data if hacked, as complete financial instrument and/or user details are not stored by the verification agent.

(iii) In certain embodiments, transfer of funds from the purchaser's financial instrument to the merchant is initiated immediately and verification of authorisation can be performed almost instantly or shortly after the funds transfer is requested.

(iv) In certain embodiments where the verification is via a financial institution or card scheme network using a verification agent, the merchant receives authorisation for the transaction that has been subjected to verification from the payment gateway. The verification agent is thus transparent to the merchant as existing processes continue to be utilised. Commencement of funds clearing and settlement by the financial institutions may be deferred until such time as the purchaser authentication is completed, thus providing advantages to the financial institution. This also has the benefit of minimal, if any, changes to intercommunications between the merchant and the payment gateway for the purpose of processing transactions.

(v) The purchaser does not have to complete, prior to an actual transaction, any initialisation processes, intermediate or third party sign up/account creation, advance authorisation or other processes not directly associated with the purchase.

(vi) Dependent upon the implementation chosen, the merchant does not have to complete any intermediate or third party sign up/account creation, or deal with any financial institutions, payment gateways, and/or card scheme networks other than those it already deals with.

(vii) Verification of authorisation can be performed on a case-by-case basis, including and up to the case of each and every transaction.

(viii) Where a card or other financial instrument operates in a currency that differs from the currency used by a merchant, there is no need to know the actual exchange rate between the financial instrument currency and the merchant's currency.

(ix) The sum of the individual amounts of money charged to the financial instrument nominated by the purchaser equals the total of the actual transaction as initiated by the purchaser without the need for separate transactions to provide 'balancing' credits or charges.

(x) Confirmation of the plurality of charges and random amounts charged (the sum of which equals the predetermined amount) provides a high level of confidence against fraud.

(xi) Devices, electronically routable addresses or electronic files used or submitted as part of the verification process may also be linked to the successful purchaser authentication and used to identify the customer for subsequent applications or link either combination of the customer's real world name, customer identifier, device serial number, electronically routable addresses, files, financial instrument and the transaction to each other.

(xii) Devices, electronically routable addresses, serial numbers, MAC addresses, IMEI numbers, etc., may be captured for later use as evidence in chargeback dispute situations on a transactional basis and may be optionally linked to the payer for future reference.

(xiii) Unlike pre-assigned static PIN codes logically attached to a financial instrument, such as Visa's 3D Secure™ or Mastercard's SecureCode™, the generation of the plurality of charges act as one time dynamically generated code associated with a specified transaction only. This is advantageous as a static PIN is not stored centrally, with such static PIN subject to hacking and unauthorised use, and, by virtue of the plurality of charges acting as one time codes, each transaction has its own unique authorisation characteristic. This affords security which is orders of magnitude more difficult to break by hacking methods than hacking of a conventional PIN. It also does not suffer from the security concerns associated with storage of card details alongside a PIN in server systems, and the catastrophic consequences of card number and PIN being used by unauthorised parties.

(xiv) The timing and optionally the IP address of the customer accessing the plurality of charges via their existing internet banking can be recorded by the financial institution, and, compared to the timing and optionally the IP address of the response to the verification agent, provide further evidence of authorisation by the cardholder.

INDUSTRIAL APPLICABILITY

The arrangements described are applicable to the computer and data processing industries and particularly for processing and verifying electronic transactions.

The foregoing description provides exemplary embodiments only, and is not intended to limit the scope, applicability or configurations of the present invention. Rather, the description of the exemplary embodiments provides those skilled in the art with enabling descriptions for implementing embodiments of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth. Furthermore, features, elements and steps referred to or described in relation to one particular embodiment of the invention may form part of any of the other embodiments unless stated to the contrary.

(Australia Only) In the context of this specification, the word "comprising" means "including principally but not necessarily solely" or "having" or "including", and not "consisting only of". Variations of the word "comprising", such as "comprise" and "comprises" have correspondingly varied meanings:

The invention claimed is:

1. A computer-implemented method for verifying authorization of a transaction, when executed by a processor, causing the processor to perform the steps of:
    receiving a request to process a single electronic transaction for a predetermined amount of money, said request comprising data identifying a particular financial instrument;
    dividing the predetermined amount into a plurality of charges;
    storing information relating to said plurality of charges comprising one or more of the group consisting of:
        amount of each of said plurality of charges; and
        number of said plurality of charges;
    causing said financial instrument to be debited with each of said plurality of charges;
    receiving information relating to said plurality of charges from an originator of said request;
    comparing said information received from the originator of said request to said stored information relating to said plurality of charges to determine whether said information received from the originator of said request is correct; and
    verifying said transaction only if said information is correct.

2. The computer-implemented method of claim 1, wherein the sum of said plurality of charges is equal to said predetermined amount of money.

3. The computer-implemented method of claim 1, wherein said received information received from the originator of said request comprises the amount of each of said plurality of charges each modified by a single currency exchange rate, and said method comprises the further steps of:
    converting each of said plurality of charges to a respective charge ratio by dividing each of said plurality of charges by the predetermined amount;
    storing each of said charge ratios;
    converting each of said received amount of each of said plurality of charges to a respective value ratio by dividing each of said received amount of each of said plurality of charges by the sum of said received amount of each of said plurality of charges,
    wherein comparing said information received from the originator of said request to said stored information relating to said plurality of charges comprises comparing said value ratios to said stored charge ratios,
    wherein said received information is correct if each of said value ratios matches a respective said stored charge ratio within a predefined margin of error.

4. A computer-implemented method of claim 1, wherein verifying comprises verifying an electronic signature associated with a contract or record associated with said transaction.

5. A computer implemented method of claim 1, wherein verifying said information comprises the amount of each of said plurality of charges that represent one time keys.

6. A computer-implemented method of claim 1, wherein the method is applied to individual transactions.

7. A computer system for verifying authorization of a transaction, said computer system comprising:
    a memory for storing data and program instructions; and
    at least one processor coupled to said memory, said at least one processor programmed to:
    receive a request to process a single electronic transaction for a predetermined amount of money, said request comprising data identifying a particular financial instrument;
    divide the predetermined amount into a plurality of charges;
    store in memory information relating to said plurality of charges comprising one or more of the group consisting of:
        amount of each of said plurality of charges; and
        number of said plurality of charges;
    cause said financial instrument to be debited with each of said plurality of charges;
    receive information relating to said plurality of charges from an originator of said request;
    compare said information received from the originator of said request to said stored information relating to said plurality of charges to determine whether said information received from the originator of said request is correct; and
    verify said transaction only if said information is correct.

8. The computer system according to claim 7, wherein the sum of said plurality of charges is equal to said predetermined amount of money.

9. A non-transitory computer readable storage medium storing therein instructions that when performed by a processor cause a computer to:
    receive a request to process a single electronic transaction for a predetermined amount of money, said request comprising data identifying a particular financial instrument;
    divide the predetermined amount into a plurality of charges;
    store information relating to said plurality of charges comprising one or more of the group consisting of:
        amount of each of said plurality of charges; and
        number of said plurality of charges;
    cause said financial instrument to be debited with each of said plurality of charges;
    receive information relating to said plurality of charges from an originator of said request;
    compare said information received from the originator of said request to said stored information relating to said plurality of charges to determine whether said information received from the originator of said request is correct; and
    verify said transaction only if said information is correct.

10. The computer program product according to claim 9, wherein the instructions further cause the computer to determine said plurality of charges such that the sum of said plurality of charges is equal to said predetermined amount of money.

11. A computer-implemented method for verifying transactions, when executed by a processor, causing the processor to perform the steps of:
  receiving a request to verify a single electronic transaction for a predetermined amount of money;
  dividing said predetermined amount into a plurality of charges;
  store information relating to said plurality of charges comprising one or more of the group consisting of:
    amount of each of said plurality of charges; and
    number of said plurality of charges;
  providing said plurality of charges to facilitate debiting of said financial instrument with each of said plurality of charges;
  receiving information relating to said plurality of charges, said information originating from a user of said financial instrument after said plurality of charges has been debited to said financial instrument;
  comparing said information received from said user to said stored information relating to said plurality of charges to determine whether said information received from said user is correct; and
  verifying said transaction only if said received information is correct.

12. The computer-implemented method of claim 11, wherein the sum of said plurality of charges is equal to said predetermined amount of money.

13. The computer-implemented method of claim 11, wherein the party performing the computer-implemented method is provided with insufficient information to enable identification of said financial instrument.

14. The computer-implemented method of claim 11, comprising the further step of storing a currency exchange rate associated with said transaction.

15. The computer-implemented method of claim 11, wherein said received information received from said user comprises the amount of each of said plurality of each modified by a single currency exchange rate, and said method comprises the further steps of:
  converting each of said plurality of charges to a respective charge ratio by dividing each of said plurality of charges by the predetermined amount;
  storing each of said charge ratios;
  converting each of said received amount of each of said plurality of charges to a respective value ratio by dividing each of said received amount of each of said plurality of charges by the sum of said received amount of each of said plurality of charges,
  wherein comparing said information received from said user to said stored information relating to said plurality of charges comprises comparing said value ratios to said stored charge ratios,
  wherein said received information is correct if each of said value ratios matches a respective said stored charge ratio within a predefined margin of error.

16. A computer-implemented method of claim 11, wherein verifying comprises verifying an electronic signature associated with a contract or record associated with said transaction.

17. A computer implemented method of claim 11, wherein verifying said information comprises the amount of each of said plurality of charges that represent one time keys.

18. A computer-implemented method of claim 11, wherein the method is applied to individual transactions.

19. A computer system for verifying transactions, said computer system comprising:
  a memory for storing data and program instructions; and
  at least one processor coupled to said memory, said at least one processor programmed to:
    receive a request to verify a single electronic transaction for a predetermined amount of money;
    divide said predetermined amount into a plurality of charges;
    store in memory information relating to said plurality of charges comprising one or more of the group consisting of:
      amount of each of said plurality of charges; and
      number of said plurality of charges;
    provide said plurality of charges to facilitate debiting of said financial instrument with each of said plurality of charges;
    receive information relating to said plurality of charges, said information originating from a user of said financial instrument after said plurality of charges has been debited to said financial instrument;
    compare said information received from said user to said stored information relating to said plurality of charges to determine whether said information received from said user is correct: and
    verify said transaction only if said received information is correct.

20. A non-transitory computer readable storage medium storing therein instructions that when performed by a processor cause a computer to:
  receive a request to verify a single electronic transaction for a predetermined amount of money;
  divide said predetermined amount into a plurality of charges;
  store in memory information relating to said plurality of charges comprising one or more of the group consisting of:
    amount of each of said plurality of charges; and
    number of said plurality of charges
  provide said plurality of charges to facilitate debiting of said financial instrument with each of said plurality of charges;
  receive information relating to said plurality of charges, said information originating from a user of said financial instrument after said plurality of charges has been debited to said financial instrument;
  compare said information received from said user to said stored information relating to said plurality of charges to determine whether said information received from said user is correct: and
  verify said transaction only if said received information is correct.

21. The computer program product of claim 20, wherein the sum of said plurality of charges is equal to said predetermined amount of money.

* * * * *